US011670067B2

(12) United States Patent
Ito

(10) Patent No.: US 11,670,067 B2
(45) **Date of Patent: *Jun. 6, 2023**

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Yasushi Ito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 17/357,261

(22) Filed: Jun. 24, 2021

(65) Prior Publication Data

US 2021/0397798 A1 Dec. 23, 2021

Related U.S. Application Data

(63) Continuation of application No. 15/785,832, filed on Oct. 17, 2017, now Pat. No. 11,074,418.

(30) Foreign Application Priority Data

May 15, 2017 (JP) ............................. JP2017-096189

(51) Int. Cl.

| | |
|---|---|
| ***G06F 40/40*** | (2020.01) |
| ***G06F 40/58*** | (2020.01) |
| ***G06F 40/106*** | (2020.01) |
| ***G06V 10/22*** | (2022.01) |
| ***G06V 30/414*** | (2022.01) |

(52) U.S. Cl.

CPC ............ *G06F 40/40* (2020.01); *G06F 40/106* (2020.01); *G06F 40/58* (2020.01); *G06V 10/235* (2022.01); *G06V 30/414* (2022.01)

(58) Field of Classification Search

None

See application file for complete search history.

(56) References Cited

U.S. PATENT DOCUMENTS

| | | | |
|---|---|---|---|
| 8,479,095 | B2 | 7/2013 | Nagamine et al. |
| 9,442,923 | B1 | 9/2016 | Abou Mahmoud et al. |
| 9,858,272 | B2 | 1/2018 | Bareket et al. |
| 2001/0032070 | A1 | 10/2001 | Teicher |

(Continued)

FOREIGN PATENT DOCUMENTS

| | | |
|---|---|---|
| JP | H11-015826 A | 1/1999 |
| JP | 2000-332984 A | 11/2000 |

(Continued)

OTHER PUBLICATIONS

May 27, 2020 Office Action issued in U.S. Appl. No. 15/785,832.

(Continued)

*Primary Examiner* — Justin S Lee

(74) *Attorney, Agent, or Firm* — Oliff PLC

(57) ABSTRACT

An information processing apparatus includes a receiving unit, an obtaining unit, and a translating unit. The receiving unit receives a document as a target to be translated. The obtaining unit obtains a non-target region from the document, the non-target region being a region that is not a target to be translated. The translating unit does not perform translation on the non-target region but performs translation on a portion other than the non-target region.

6 Claims, 18 Drawing Sheets

(56) References Cited

U.S. PATENT DOCUMENTS

| | | | | |
|---|---|---|---|---|
| 2003/0040899 | A1 | 2/2003 | Ogilvie | |
| 2003/0120478 | A1 | 6/2003 | Palmquist | |
| 2003/0200505 | A1 | 10/2003 | Evans | |
| 2007/0250509 | A1 | 10/2007 | Marti et al. | |
| 2007/0250528 | A1 | 10/2007 | Ahs et al. | |
| 2007/0250821 | A1 | 10/2007 | Mola Marti et al. | |
| 2008/0300858 | A1 | 12/2008 | Konno | |
| 2008/0317348 | A1 | 12/2008 | Saito | |
| 2009/0076792 | A1 | 3/2009 | Lawson-Tancred | |
| 2009/0154811 | A1 | 6/2009 | Konno | |
| 2012/0096348 | A1 | 4/2012 | Nagamine et al. | |
| 2013/0191108 | A1 | 7/2013 | Anisimovich et al. | |
| 2014/0288946 | A1 | 9/2014 | Shinohara et al. | |
| 2014/0297254 | A1 | 10/2014 | Yeo et al. | |
| 2015/0134318 | A1* | 5/2015 | Cuthbert | G06F 40/58 715/231 |
| 2016/0034447 | A1 | 2/2016 | Shin et al. | |
| 2016/0259760 | A1 | 9/2016 | Gusakov et al. | |

FOREIGN PATENT DOCUMENTS

| | | | |
|---|---|---|---|
| JP | 2002-278961 | A | 9/2002 |
| JP | 2005-167522 | A | 6/2005 |
| JP | 2012-090061 | A | 5/2012 |

OTHER PUBLICATIONS

Nov. 23, 2020 Office Action issued in U.S. Appl. No. 15/785,832.

Feb. 9, 2021 Office Action issued in Japanese Patent Application No. 2017-096189.

Mar. 22, 2021 Notice of Allowance issued in U.S. Appl. No. 15/785,832.

Apr. 7, 2021 Office Action issued in Chinese Patent Application No. 201711275017.8.

Sep. 2, 2021 Office Action issued in Chinese Patent Application No. 201711275017.8.

* cited by examiner

310 — Since its founding in 1962, Fuji Xerox has contributed to the "democratization of information" through the transmission of documents by means of copying machines. Since then, in the 1990s, not only did the information volume dramatically 320 — increase due to the IT revolution, its ~330 FUJI XEROX distribution route and form also diversified and became complicated. Furthermore, with the evolution of information and communication technology (ICT) in recent years, power to select and utilize 350 — valuable knowledge and information has become more demanded. Under such a large paradigm shift, it is becoming difficult for us as well as our customers to continue business growth in the former way. The real value as a company is questioned in determining how to face the complex and advanced information-oriented society and how to continue business growth.

| ID (610) | RECTANGULAR REGION (STARTING POINT AT UPPER LEFT, END POINT AT LOWER RIGHT) (620) |
|---|---|
| J1 | (200, 800), (600, 1000) |

| ID (710) | RECTANGULAR REGION (STARTING POINT AT UPPER LEFT, END POINT AT LOWER RIGHT) (720) |
|---|---|
| L1 | (0, 800), (500, 1050) |

| ID (810) | RECTANGULAR REGION (STARTING POINT AT UPPER LEFT, END POINT AT LOWER RIGHT) (820) |
|---|---|
| L1-1 | (0, 800), (250, 1000) |
| L1-2 | (0, 1000), (450, 1050) |

FIG. 14A
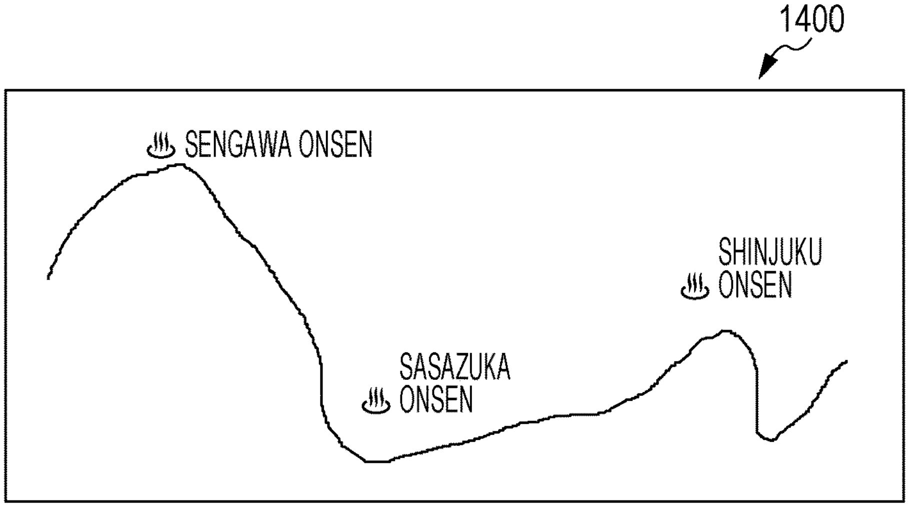
FIG. 14B
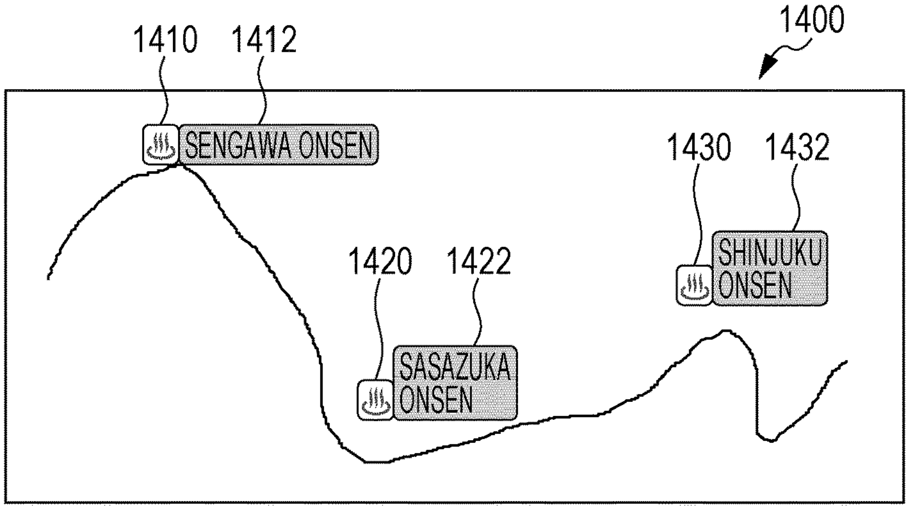
FIG. 15
1510 1520 1500
| ID | NON-TARGET IMAGE |
|---|---|
| JT1 | ♨ |

FIG. 18A

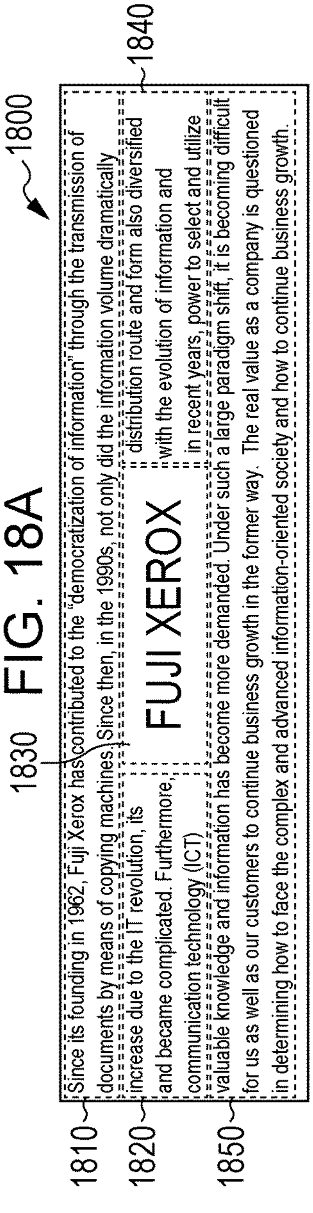

FIG. 18B1

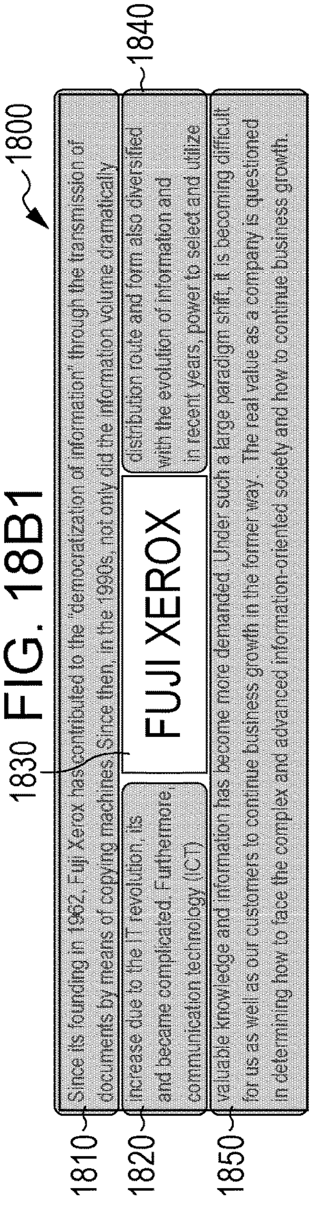

FIG. 18C

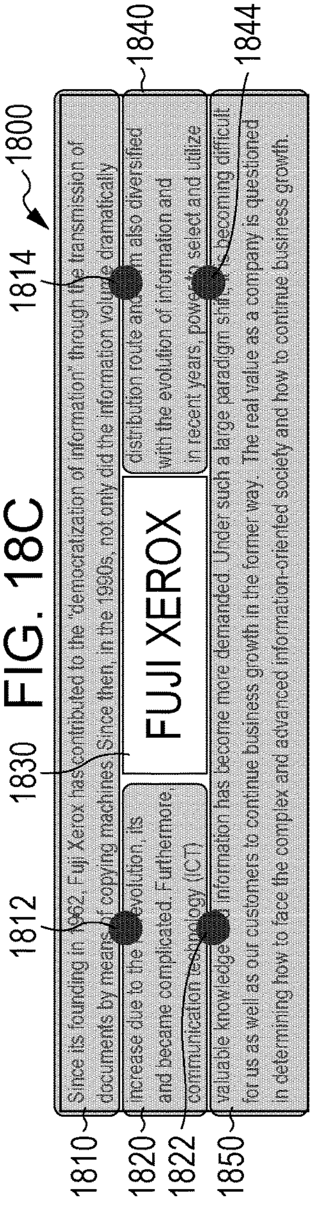

FIG. 18B2

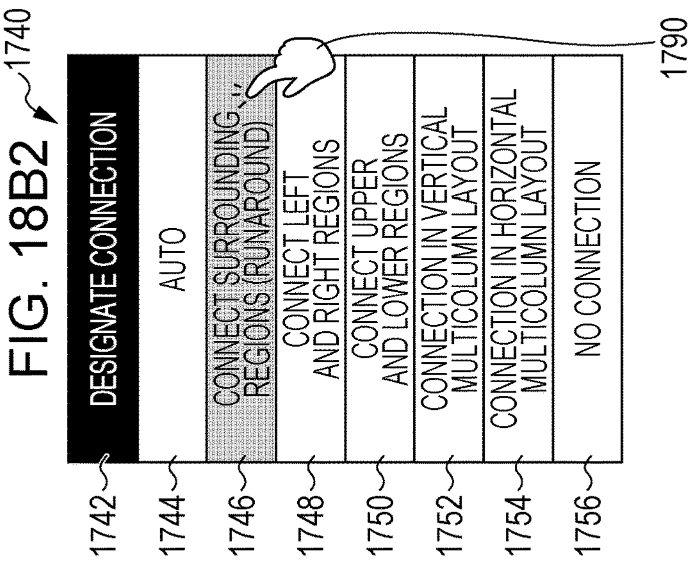

FIG. 18D

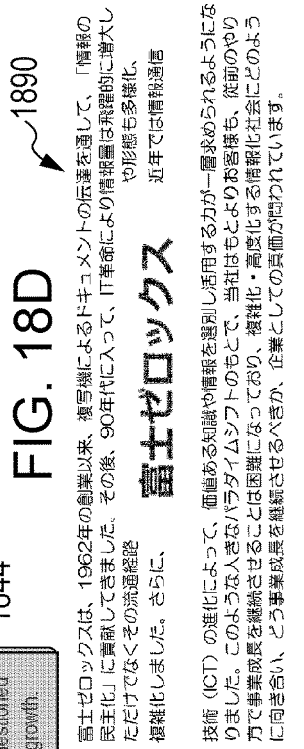

Since its founding in 1962, Fuji Xerox has contributed to the "democratization of information" through the transmission of documents by means of copying machines. Since then, in the 1990s, not only did the information volume dramatically increase due to the IT revolution, its distribution route and form also diversified and became complicated. Furthermore, with the evolution of information and communication technology (ICT) in recent years, power to select and utilize valuable knowledge and information has become more demanded. Under such a large paradigm shift, it is becoming difficult for us as well as our customers to continue business growth in the former way. The real value as a company is questioned in determining how to face the complex and advanced information-oriented society and how to continue business growth.

FUJI XEROX

FIG. 18B1

Since its founding in 1962, Fuji Xerox has contributed to the "democratization of information" through the transmission of documents by means of copying machines. Since then, in the 1990s, not only did the information volume dramatically increase due to the IT revolution, its distribution route and form also diversified and became complicated. Furthermore, with the evolution of information and communication technology (ICT) in recent years, power to select and utilize valuable knowledge and information has become more demanded. Under such a large paradigm shift, it is becoming difficult for us as well as our customers to continue business growth in the former way. The real value as a company is questioned in determining how to face the complex and advanced information-oriented society and how to continue business growth.

FUJI XEROX

FIG. 18B2

| DESIGNATE CONNECTION |
|---|
| AUTO |
| CONNECT SURROUNDING REGIONS (RUNAROUND) 👆 |
| CONNECT LEFT AND RIGHT REGIONS |
| CONNECT UPPER AND LOWER REGIONS |
| CONNECTION IN VERTICAL MULTICOLUMN LAYOUT |
| CONNECTION IN HORIZONTAL MULTICOLUMN LAYOUT |
| NO CONNECTION |

Since its founding in 1962, Fuji Xerox has contributed to the "democratization of information" through the transmission of documents by means of copying machines. Since then, in the 1990s, not only did the information volume dramatically increase due to the IT revolution, its distribution route and form also diversified and became complicated. Furthermore, with the evolution of information and communication technology (ICT) in recent years, power to select and utilize valuable knowledge and information has become more demanded. Under such a large paradigm shift, it is becoming difficult for us as well as our customers to continue business growth in the former way. The real value as a company is questioned in determining how to face the complex and advanced information-oriented society and how to continue business growth.

FUJI XEROX

富士ゼロックスは、1962年の創業以来、複写機によるドキュメントの伝達を通じて、「情報の民主化」に貢献してきました。その後、90年代に入ってはIT革命によりお客様の情報量は飛躍的に増大しただけでなくその流通経路や形態も多様化、複雑化しました。さらに、近年では情報通信技術（ICT）の進化によって、価値ある知識や情報を選別し活用する力がより一層求められるようになりました。このような大きなパラダイムシフトのもとで、当社はもとよりお客様も、従前のやり方で事業成長を継続させることは困難になっており、複雑化・高度化する情報化社会にどのように向き合い、どう事業成長を継続させるべきか、企業としての真価が問われています。

FIG. 19B2
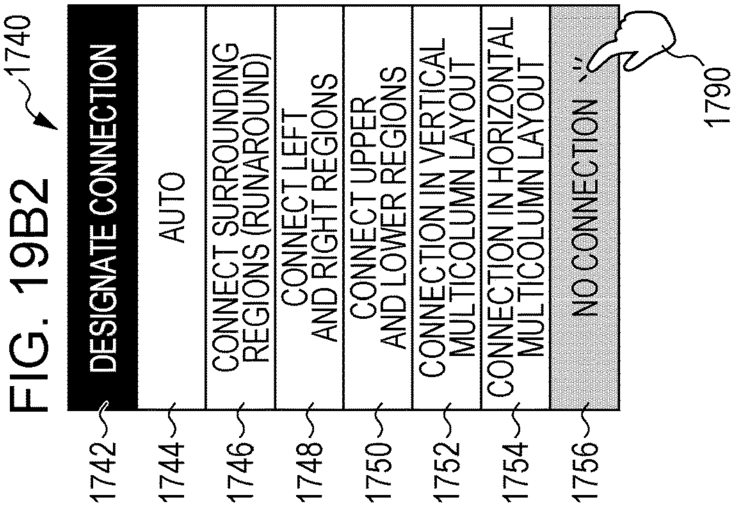
FIG. 19B1
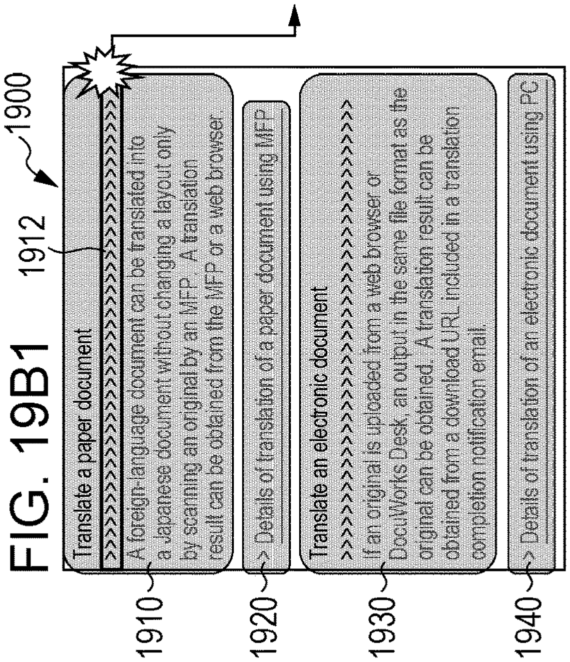
FIG. 19A
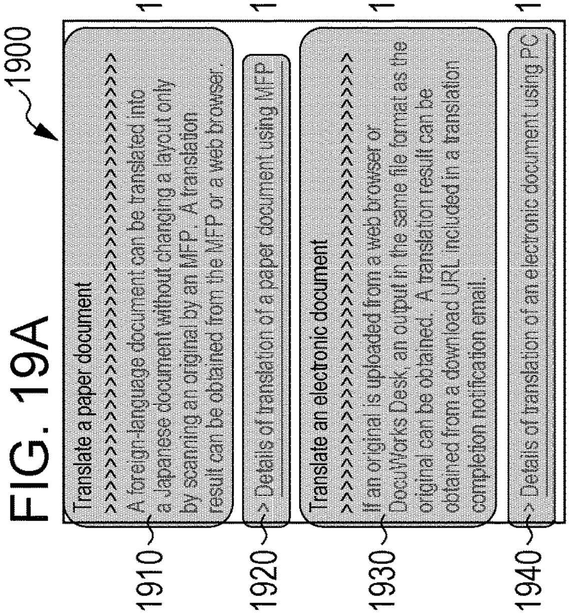
FIG. 19C
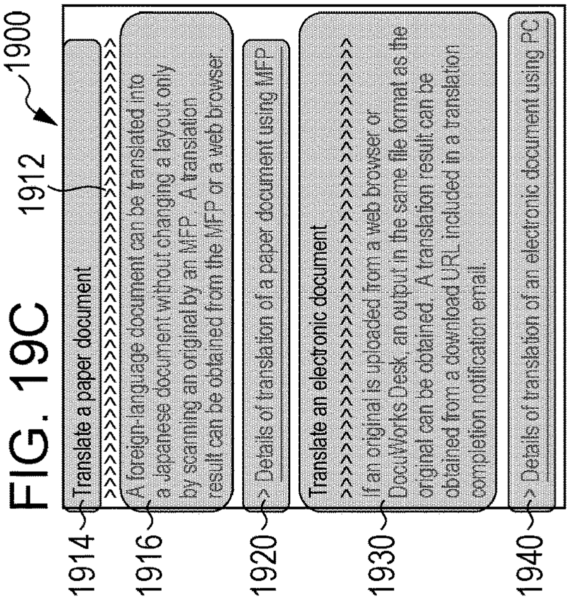

INFORMATION PROCESSING APPARATUS AND NON-TRANSITORY COMPUTER READABLE MEDIUM

CROSS-REFERENCE TO RELATED APPLICATIONS

This application is a continuation of U.S. patent application Ser. No. 15/785,832, filed Oct. 17, 2017, which is based on and claims priority under 35 USC 119 from Japanese Patent Application No. 2017-096189 filed May 15, 2017.

BACKGROUND

Technical Field

The present invention relates to an information processing apparatus and a non-transitory computer readable medium.

SUMMARY

According to an aspect of the invention, there is provided an information processing apparatus including a receiving unit, an obtaining unit, and a translating unit. The receiving unit receives a document as a target to be translated. The obtaining unit obtains a non-target region from the document, the non-target region being a region that is not a target to be translated. The translating unit does not perform translation on the non-target region but performs translation on a portion other than the non-target region.

BRIEF DESCRIPTION OF THE DRAWINGS

An exemplary embodiment of the present invention will be described in detail based on the following figures, wherein:

FIG. 3 is an explanatory diagram illustrating an example of a target to be processed according to the exemplary embodiment;

FIG. 6 is an explanatory diagram illustrating an example data structure of a non-target region table;

FIG. 7 is an explanatory diagram illustrating an example data structure of a layout information table;

FIG. 8 is an explanatory diagram illustrating an example data structure of the layout information table (after exclusion);

FIGS. 14A and 14B are explanatory diagrams illustrating an example process according to the exemplary embodiment;

FIG. 15 is an explanatory diagram illustrating an example data structure of a non-target image table;

FIGS. 18A to 18D are explanatory diagrams illustrating an example process according to the exemplary embodiment;

FIGS. 19A to 19C are explanatory diagrams illustrating an example process according to the exemplary embodiment;

DETAILED DESCRIPTION

Hereinafter, an exemplary embodiment of the present invention will be described with reference to the attached drawings.

Figure 1:
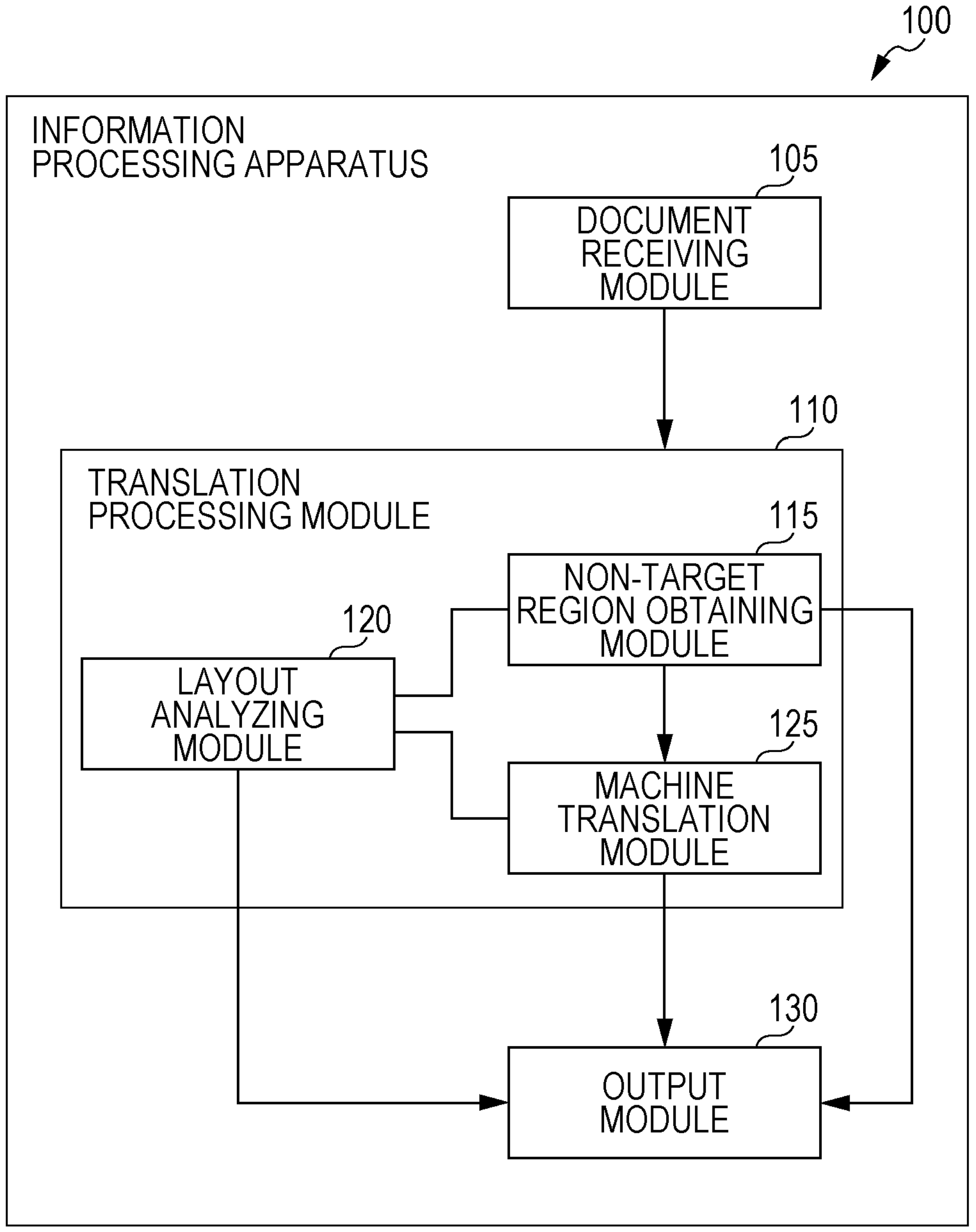
FIG. 1 is a conceptual module configuration diagram illustrating an example configuration according to the exemplary embodiment.

FIG. 1 is a conceptual module configuration diagram illustrating an example configuration according to the exemplary embodiment.

Modules are components of software (computer programs) or hardware that may be logically separated from one another in general. Thus, the modules according to the exemplary embodiment correspond to not only modules in a computer program but also modules in a hardware configuration. Therefore, the description of the exemplary embodiment includes a description of a computer program for causing a computer to function as those modules (a program for causing a computer to execute individual program steps, a program for causing a computer to function as individual units, or a program for causing a computer to implement individual functions), a system, and a method. For the convenience of description, expressions "store" and "cause . . . to store", and expressions equivalent thereto will be used. These expressions specifically mean "cause a memory to store" or "perform control to cause a memory to store" in the case of a computer program. The modules may correspond to functions in a one-to-one relationship. In terms of packaging, a single module may be constituted by a single program, plural modules may be constituted by a single program, or a single module may be constituted by plural programs. Also, plural modules may be implemented by a single computer, or a single module may be implemented by plural computers in a distributed or parallel environment. Alternatively, a single module may include another module. Hereinafter, "connection" is used to refer to a logical connection (transmission and reception of data, an instruction, a reference relationship between pieces of data, etc.) as well as a physical connection. "Predetermined" means being determined before target processing, and includes the meaning of being determined in accordance with a present situation/state or in accordance with a previous situation/state before target processing after processing according to the exemplary embodiment starts, as well as before processing according to the exemplary embodiment starts. In a case where there are plural predetermined values, the plural predetermined values may be different from one another, or two or more of the values (of course including all the values) may be the same. A description "in the case of A, B is performed" is used in the meaning "whether A or not is determined, and B is performed if it is determined A", except for a case where determination of whether A or not is unnecessary. In the case of listing something, for example, "A, B, and C", they are merely examples unless otherwise noted, and a case where only one of them (for example, only A) is selected is included.

A system or apparatus may be constituted by plural computers, hardware units, devices, or the like connected to one another via a communication medium, such as a network (including communication connections having a one-to-one correspondence), or may be constituted by a single computer, hardware unit, device, or the like. "Apparatus" and "system" are used synonymously. Of course, "system" does not include a man-made social "organization" (social system).

Target information is read from a memory in individual processing operations performed by respective modules or in individual processing operations performed by a single module. After each processing operation has been performed, a processing result is written into the memory. Thus, a description of reading from the memory before a processing operation and writing into the memory after a processing operation may be omitted. Here, examples of the memory include a hard disk, a random access memory (RAM), an external storage medium, a memory connected through a communication network, a register in a central processing unit (CPU), and the like.

An information processing apparatus 100 according to an exemplary embodiment performs translation (machine translation) and includes, as illustrated in FIG. 1, a document receiving module 105, a translation processing module 110, and an output module 130.

Some documents include a figure, a company logo, or the like as well as a character region. When such a document is to be translated, there may be a region that should not be a target to be translated, such as characters in the figure or the company logo. When a document is to be translated, it is generally possible to designate a region that is a target to be translated but it is generally impossible to explicitly designate a region that is not a target to be translated. That is, not designating a region that is not a target to be translated is designating the region as a target to be translated. Particularly in a case where there are many character regions and there are a few regions that are not a target to be translated, operations to be performed by an operator increase.

The information processing apparatus 100 according to the exemplary embodiment enables the operator to perform a fewer operations to designate a region that is not a target to be translated, compared to the case of designating a region that is a target to be translated.

The document receiving module 105 is connected to the translation processing module 110. The document receiving module 105 receives a document (original) as a target to be translated. The document may be a document image, which is an image obtained by reading a paper document, or may be an electronic document (including a structured document) or the like. Examples of the document image include an image obtained by reading a document by using a scanner, a camera, or the like, and an image received from an external apparatus by facsimile or the like through a communication line. The electronic document (also referred to as a file) includes at least text data as a target to be translated, and may also include numerical data, graphic data, image data, movie data, audio data, or any selective combination thereof. The electronic document is a target to be stored, edited, or searched for, is an individual unit exchangeable between systems or users, and includes anything similar thereto. Examples of the electronic document include a document created by a document creation program and a document of a web page or the like.

"Receiving a document" includes reading a document by a scanner and reading a document stored in a hard disk or the like (for example, a hard disk built in a computer or a hard disk connected through a network). The document image may be a binary image or a multivalued image (including a color image). The number of documents to be received may be one or more. The document discussed herein only needs to include characters as a target to be translated and may be, for example, a document used in business or an advertising brochure.

When the document receiving module 105 receives a document image, character recognition may be performed on the document image. A result of the character recognition may be used as a target to be translated. When the document image is received, a region that is not a target to be translated (hereinafter also referred to as a non-target region) may be excluded from a target of character recognition because such a region is not subjected to translation. In addition, a layout analyzing module 120 may perform layout analysis at the time of character recognition.

The document received by the document receiving module 105 may include an information image indicating a non-target region. Here, the "information image" is an image code systematically created to represent electronic data in a machine readable manner and is, for example, a one-dimensional barcode, a two-dimensional code, or digital watermark information. A specific example of the two-dimensional code is Quick Response Code (registered trademark, abbreviated as QR code). The information image is embedded with information indicating a non-target region (for example, information indicating the coordinates of an upper-left corner point and a lower-right corner point of the region).

The translation processing module 110 includes a non-target region obtaining module 115, the layout analyzing module 120, and a machine translation module 125, and is connected to the document receiving module 105. The translation processing module 110 translates a document received by the document receiving module 105.

The non-target region obtaining module 115 is connected to the layout analyzing module 120, the machine translation module 125, and the output module 130. The non-target region obtaining module 115 obtains a non-target region from a document. Here, the "non-target region" is a region that is not a target to be translated and corresponds to, for example, a figure, a company logo, or the like. In particular, the non-target region corresponds to a region of characters in a figure, a company logo, or the like. However, a region other than the foregoing region may be regarded as a non-target region. For example, a character region selected by an operator's selection operation may be excluded from a target to be translated.

"Obtaining a non-target region" may be performing a designation operation by an operator (specifically, an operation of surrounding a region or an operation of selecting a region which is a result of layout analysis) or may be reading an information image in a document. That is, if there is an information image in a document, the non-target region obtaining module 115 may obtain a non-target region by using the information image.

The non-target region obtaining module 115 may present a result of layout analysis performed by the layout analyzing module 120 and may obtain a non-target region in accordance with an operator's instruction to select the non-target region.

Furthermore, the non-target region obtaining module 115 may extract a region of an image similar to an image that has already been designated as not being a target to be translated and may present the extracted region as a candidate non-target region. The operator may select the presented candidate non-target region to designate the non-target region. Here, "an image that has already been designated as not being a target to be translated" may be, for example, a predetermined image or an image in a region that has already been designated as not being a target to be translated through an operator's operation.

In addition, the non-target region obtaining module 115 may obtain information representing a connection between characters in plural regions. Specifically, the non-target region obtaining module 115 may obtain information representing a connection between characters in character regions around a non-target region.

In addition, the non-target region obtaining module 115 may present a result of layout analysis performed by the layout analyzing module 120 and may obtain information representing a connection between characters in character regions in accordance with an operator's instruction to select the connection.

The layout analyzing module 120 is connected to the non-target region obtaining module 115, the machine translation module 125, and the output module 130. The layout analyzing module 120 performs layout analysis on a document. The layout analysis may be performed by using an existing technique. For example, in the case of an electronic document, the layout thereof may be analyzed by using tag information. In the case of a document image, the image may be divided into a character region, a photograph region, a graphic region, and so forth, in accordance with a feature quantity in the image.

The machine translation module 125 is connected to the non-target region obtaining module 115, the layout analyzing module 120, and the output module 130. The machine translation module 125 does not perform translation on a non-target region designated by the non-target region obtaining module 115 but performs translation on a portion other than the non-target region. Here, "a portion other than the non-target region" is a region designated as a target to be translated and includes characters. The translation may be performed by using an existing technique.

The machine translation module 125 may perform translation in accordance with information representing a connection between characters obtained by the non-target region obtaining module 115.

The output module 130 is connected to the non-target region obtaining module 115, the layout analyzing module 120, and the machine translation module 125. The output module 130 arranges a translation result obtained from the machine translation module 125 while maintaining the layout of a document that has not been translated (a document received by the document receiving module 105) and then outputs the translation result. Here, outputting a translated document includes, for example, printing the document by a printing apparatus such as a printer, displaying the document on a display apparatus such as a display, transmitting an image of the document by an image transmitting apparatus such as a facsimile, writing the document on a document memory such as a document database, storing the document in a storage medium such as a memory card, and transmitting the document to another information processing apparatus.

The output module 130 may arrange a translation result obtained from the machine translation module 125 in a region other than a non-target region. Specifically, the output module 130 may arrange a translation result of a region around a non-target region in a region other than the non-target region. In other words, the translation result is not superimposed on the non-target region.

Figure 2A:
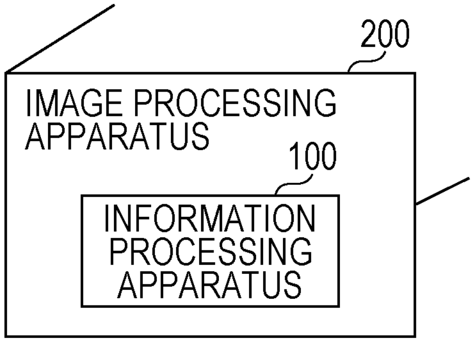
FIGS. 2A and 2B are explanatory diagrams illustrating an example system configuration according to the exemplary embodiment.
Figure 2B:
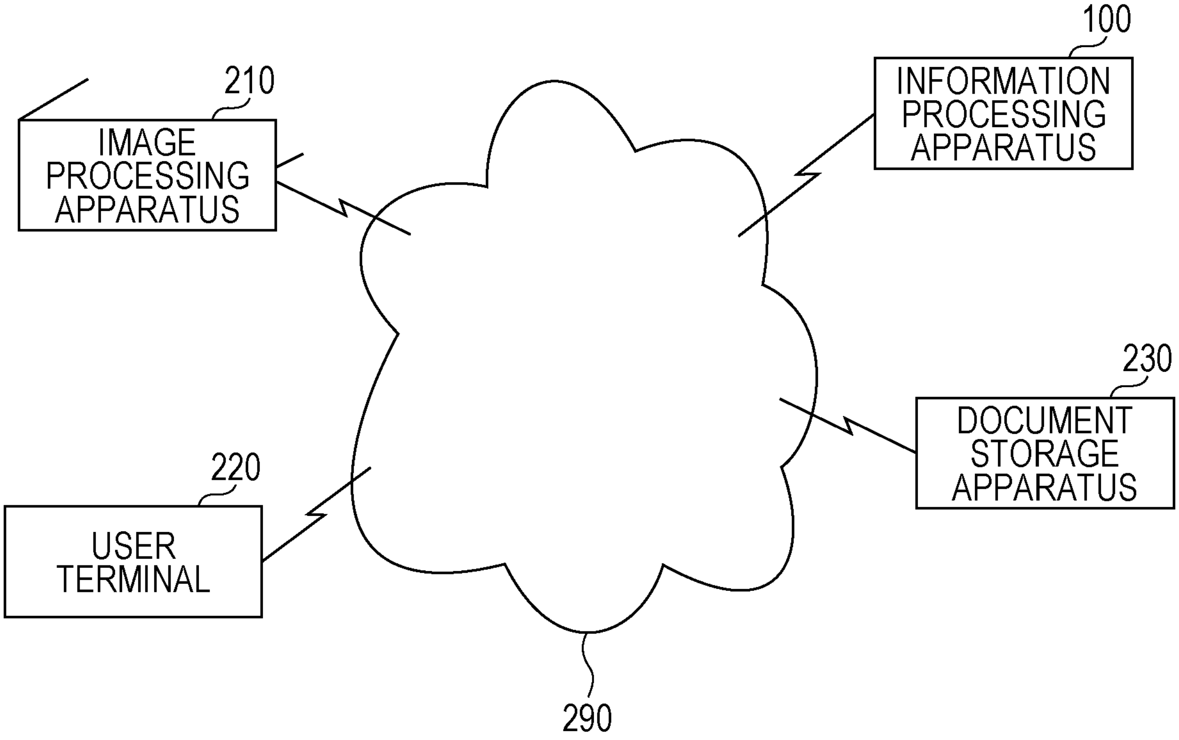

FIGS. 2A and 2B are explanatory diagrams illustrating an example system configuration according to the exemplary embodiment.

An image processing apparatus 200 illustrated in FIG. 2A includes the information processing apparatus 100. The image processing apparatus 200 is, for example, a multifunction peripheral (an image processing apparatus having any two or more of functions of a scanner, a printer, a copier, a facsimile, and so forth). The image processing apparatus 200 translates a document read by using the scanner and prints a translation result by using the printer. In a document obtained through the printing, the translation result may be arranged with the layout of the scanned document being maintained.

In the system illustrated in FIG. 2B, the information processing apparatus 100, an image processing apparatus 210, a user terminal 220, and a document storage apparatus 230 as a document repository are connected to each other through a communication line 290. The communication line 290 may be a wireless link, a wired link, or a combination thereof, and may be the Internet or an intranet as a communication infrastructure. In addition, the functions of the information processing apparatus 100 and the document storage apparatus 230 may be implemented as cloud services.

For example, the image processing apparatus 210 may read a document, transmit the image of the document to the information processing apparatus 100, receive the document that has been translated from the information processing apparatus 100, and print the document. For another example, in accordance with an operation performed by the user of the user terminal 220, an electronic document stored in the user terminal 220 or the document storage apparatus 230 may be transmitted to the information processing apparatus 100, and the document that has been translated may be received from the information processing apparatus 100. Thereafter, the translated document may be printed by the image processing apparatus 210 or may be stored in the document storage apparatus 230.

FIG. 3 is an explanatory diagram illustrating an example of a target to be processed according to the exemplary embodiment.

In a document 300 illustrated in FIG. 3, the following sentences are described around a logo region 330. "Since its founding in 1962, Fuji Xerox has contributed to the "democratization of information" through the transmission of documents by means of copying machines. Since then, in the 1990s, not only did the information volume dramatically increase due to the IT revolution, its distribution route and form also diversified and became complicated. Furthermore, with the evolution of information and communication technology (ICT) in recent years, power to select and utilize valuable knowledge and information has become more demanded. Under such a large paradigm shift, it is becoming difficult for us as well as our customers to continue business growth in the former way. The real value as a company is questioned in determining how to face the complex and advanced information-oriented society and how to continue business growth."

If the exemplary embodiment is not used, translation is performed also on the logo region 330, which is a logo. As a result of performing layout analysis, the document 300 is divided into a sentence region 310, a sentence region 320, a sentence region 340, and a sentence region 350. Connections between characters are not particularly specified and thus three lines of character strings are divided into the sentence region 320 and the sentence region 340 with the logo region 330 interposed therebetween. This physical division is regarded as logical division, the regions on the left and right (the sentence regions 320 and 340) are separately translated, and accordingly a translation result not intended by a user may be output. Specifically, from the viewpoint of context, the character strings in the sentence region 320 are not followed by the character string in the logo region 330. Instead, the character string in the first line of the sentence region 320 is followed by the character string in the first line of the sentence region 340, the character string in the second line of the sentence region 320, and the character string in the second line of the sentence region 340 in this order. If the character strings are not translated in this order, mistranslation occurs.

Figure 4:
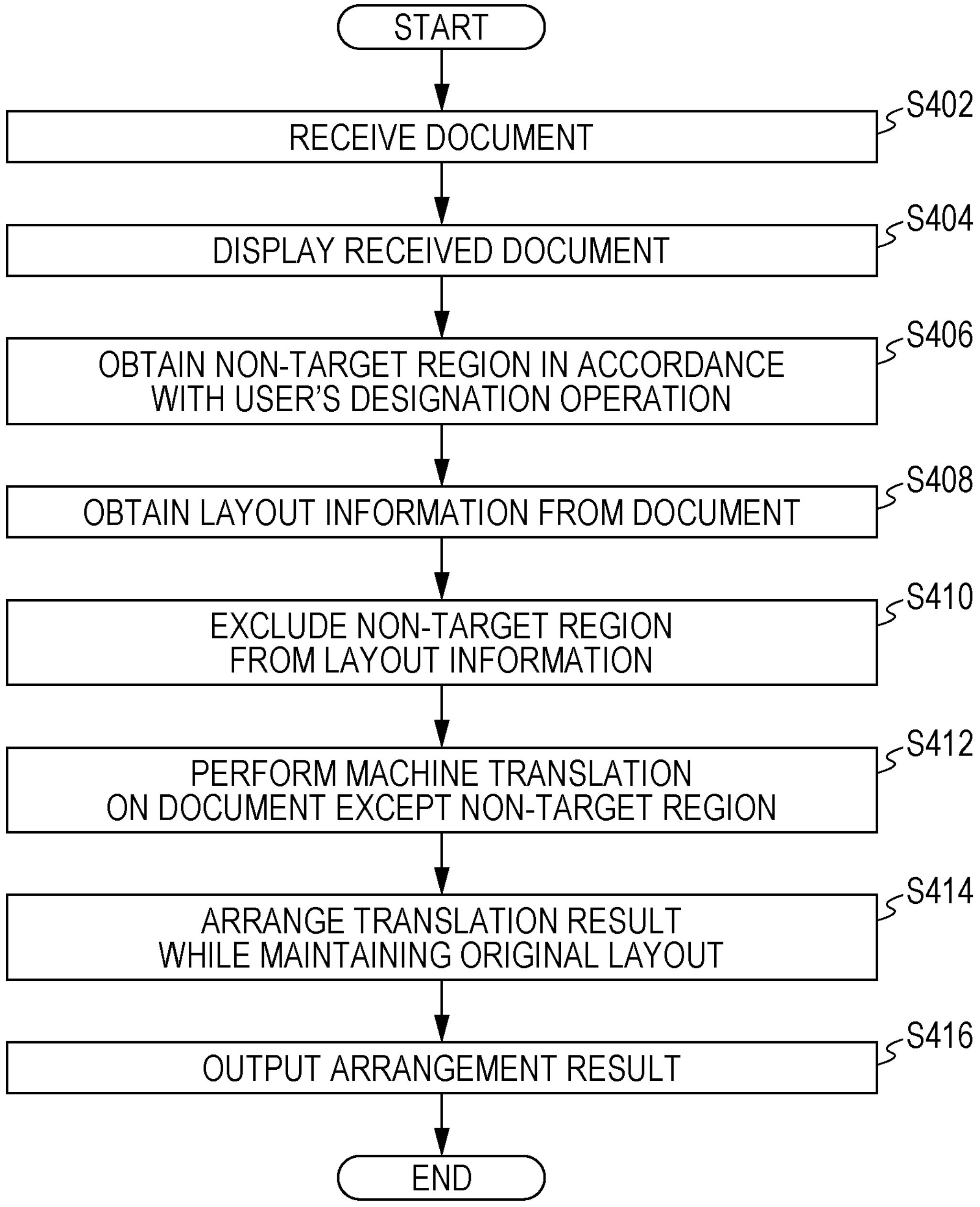
FIG. 4 is a flowchart illustrating an example process according to the exemplary embodiment.

FIG. 4 is a flowchart illustrating an example process according to the exemplary embodiment.

In step S402, the document receiving module 105 receives a document.

Figure 5:
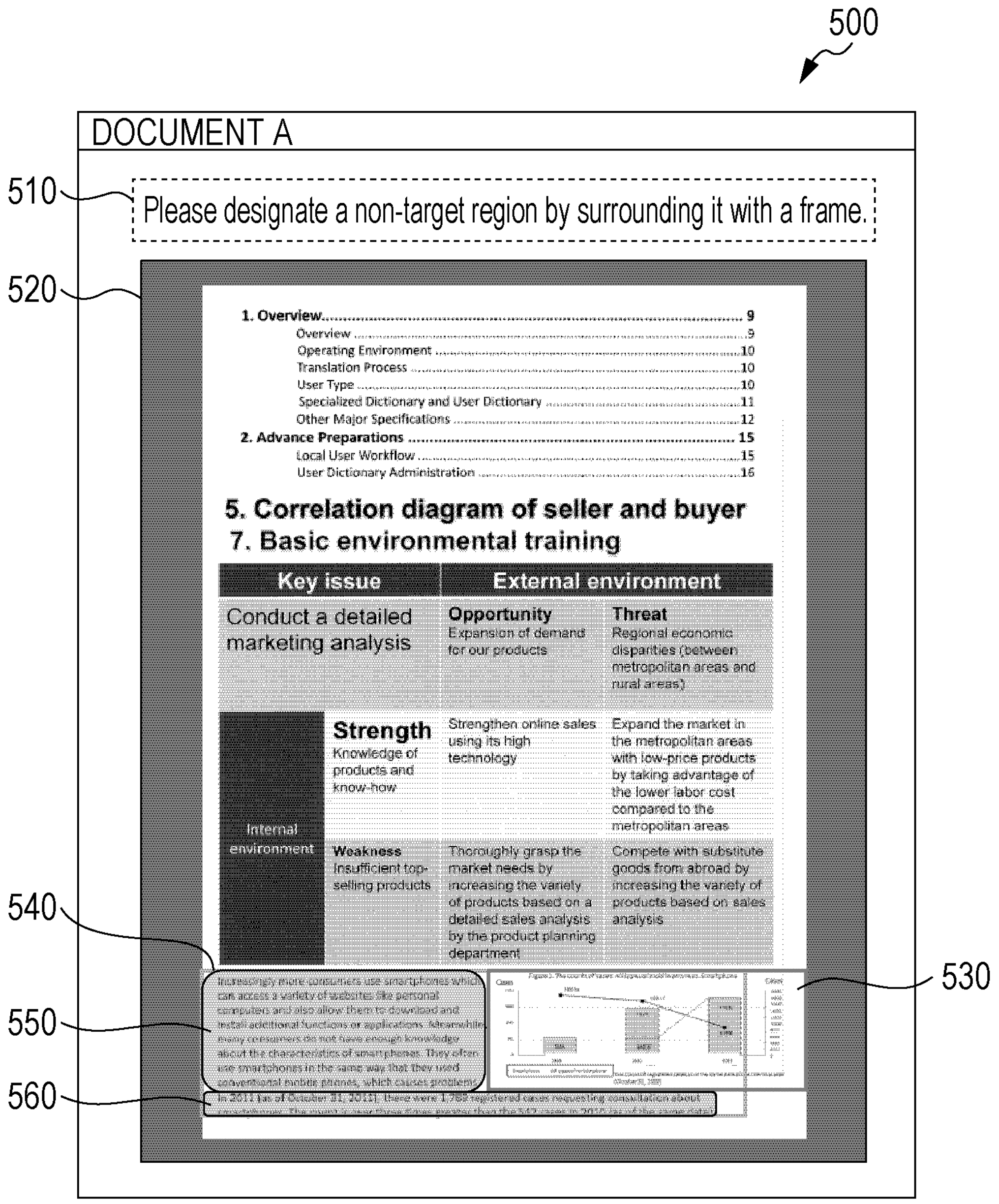
FIG. 5 is an explanatory diagram illustrating an example process according to the exemplary embodiment.

In step S404, the non-target region obtaining module 115 displays the received document. For example, the non-target region obtaining module 115 displays the document on a display apparatus such as a liquid crystal display included in the information processing apparatus 100. For example, as illustrated in FIG. 5, the non-target region obtaining module 115 displays the document in a document display region 520 of a screen 500, displays a message region 510 above the document display region 520, and displays a message "Please designate a non-target region by surrounding it with a frame" in the message region 510.

In step S406, the non-target region obtaining module 115 obtains a non-target region in accordance with a user's designation operation. As illustrated in FIG. 5, the user designates a non-target region 530 on the document displayed in the document display region 520. As the user operation, an operation with the user's finger or pen is received with the liquid crystal display, also serving as a touch screen, being controlled. Alternatively, the user operation performed by using a mouse, a keyboard, a camera, a microphone, or the like (including a line of sight, gesture, and voice) may be received.

An example of information indicating the non-target region 530 is a non-target region table 600. FIG. 6 is an explanatory diagram illustrating an example data structure of the non-target region table 600, which is a processing result of step S406 in the flowchart illustrated in FIG. 4. The non-target region table 600 includes an ID column 610 and a rectangular region column 620. The ID column 610 stores information (ID: identification) for uniquely identifying a non-target region in the exemplary embodiment. The rectangular region column 620 stores information indicating the rectangular region corresponding to the non-target region (the coordinates of an upper-left corner point and a lower-right corner point).

In step S408, the layout analyzing module 120 obtains layout information from the document. As illustrated in FIG. 5, a layout analysis result region 540 is extracted as a region of a result of layout analysis. In the example in FIG. 5, only a lower portion is illustrated as a result of layout analysis.

An example of information indicating the layout analysis result region 540 is a layout information table 700. FIG. 7 is an explanatory diagram illustrating an example data structure of the layout information table 700, which is a processing result of step S408 in the flowchart illustrated in FIG. 4. The layout information table 700 includes an ID column 710 and a rectangular region column 720. The ID column 710 stores information (ID) for uniquely identifying a layout analysis result region in the exemplary embodiment. The rectangular region column 720 stores information indicating the rectangular region corresponding to the layout analysis result region (the coordinates of an upper-left corner point and a lower-right corner point).

In step S410, the non-target region obtaining module 115 excludes the non-target region from the layout information. As a result of excluding the non-target region 530 from the layout analysis result region 540, the layout analysis result region 540 is divided into an after-exclusion region 550 and an after-exclusion region 560.

An example of information indicating the after-exclusion region 550 and the after-exclusion region 560 is a layout information table (after exclusion) 800. FIG. 8 is an explanatory diagram illustrating an example data structure of the layout information table (after exclusion) 800, which is a processing result of step S410 in the flowchart illustrated in FIG. 4. The layout information table (after exclusion) 800 includes an ID column 810 and a rectangular region column 820. The ID column 810 stores information (ID) for uniquely identifying a region that is obtained by excluding a non-target region from a layout analysis result region in the exemplary embodiment. The rectangular region column 820 stores information indicating the rectangular region corresponding to the region (the coordinates of an upper-left corner point and a lower-right corner point).

In step S412, the machine translation module 125 performs machine translation on the document except the non-target region.

In step S414, the output module 130 arranges a translation result while maintaining the layout in the original document.

In step S416, the output module 130 outputs an arrangement result.

FIGS. 9A to 9D are explanatory diagrams illustrating a specific example process according to the exemplary embodiment.

Figure 9A:
FIGS. 9A to 9D are explanatory diagrams illustrating an example process according to the exemplary embodiment.

FIG. 9A illustrates a document 900 as a target to be translated, received by the document receiving module 105. The document 900 includes a graph region adjacent to a text region. This graph region is a non-target region.

Figure 9B:
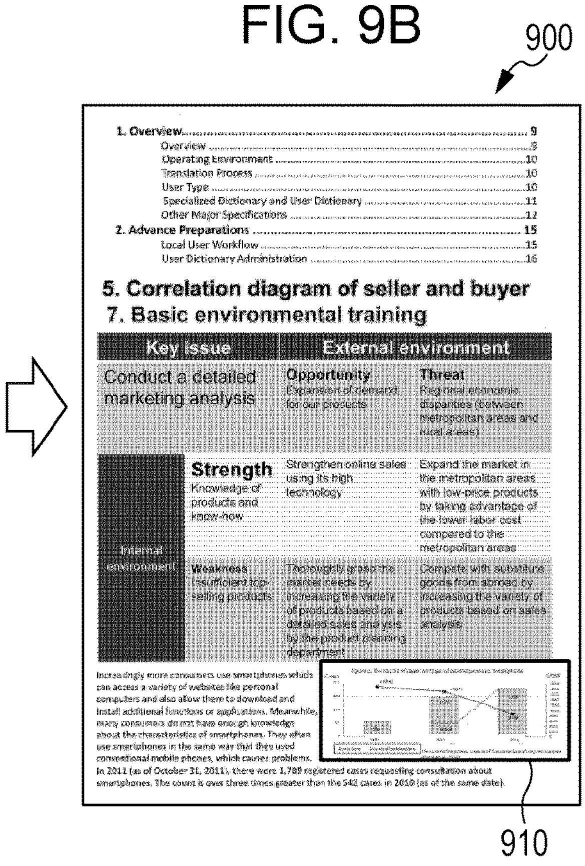

FIG. 9B illustrates an example in which a non-target region 910 in the document 900 is designated through a user operation and the non-target region obtaining module 115 obtains the non-target region 910.

If the non-target region 910 is not designated (if the information processing apparatus 100 is not used), a label and a heading on a graph axis are regarded as a part of the text region on the left side of the graph (text region 950), and an inappropriate translation result may be output. In addition, the translation result of the region on the left side of the graph may be superimposed on the graph.

Figure 9C:
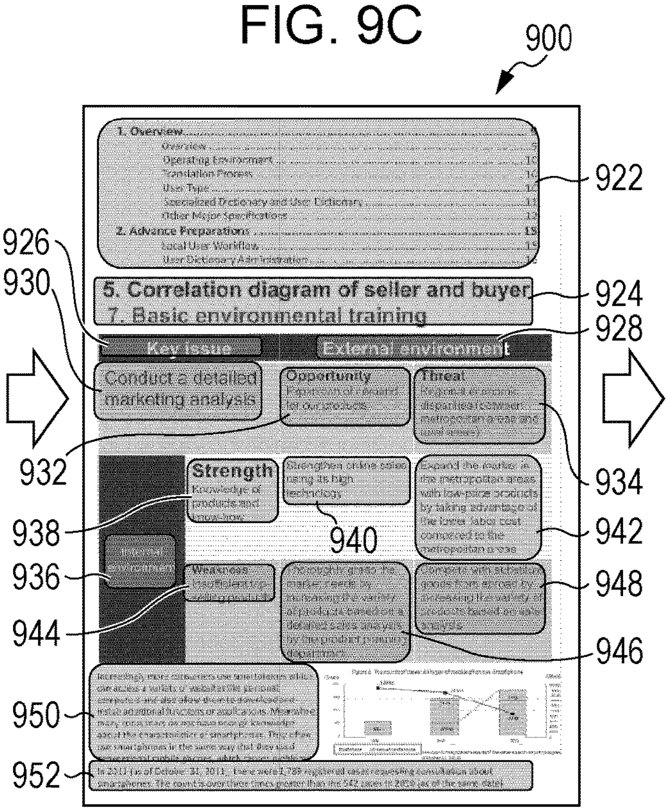

FIG. 9C illustrates an example of a layout analysis result obtained from the layout analyzing module 120. The document 900 includes a text region 922, a text region 924, a text region 926, a text region 928, a text region 930, a text region 932, a text region 934, a text region 936, a text region 938, a text region 940, a text region 942, a text region 944, a text region 946, a text region 948, a text region 950, and a text region 952, which are targets to be translated. These regions are obtained as a layout analysis result of the document 900 from which the non-target region 910 is excluded, and are obtained without any user operation.

Figure 9D:
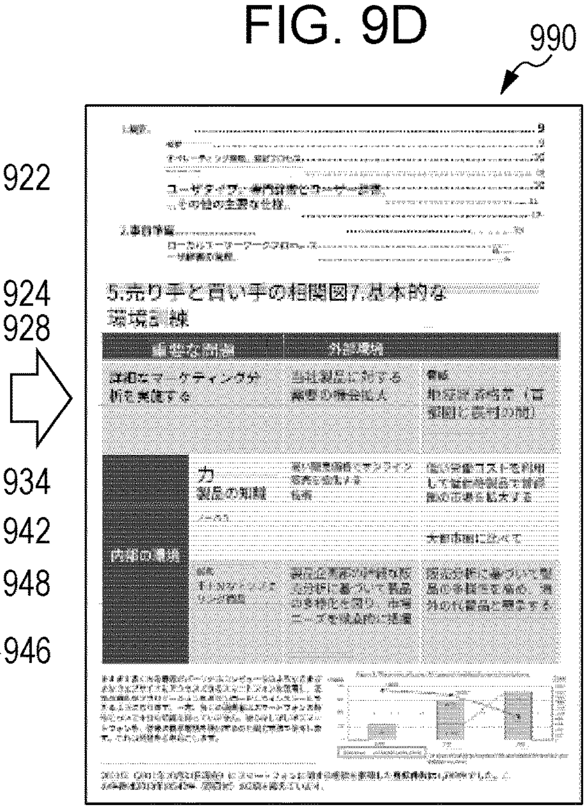

FIG. 9D illustrates an example of an output result of a translation result 990. The translation is performed while maintaining the layout in the document 900. The non-target region 910 is displayed without being translated.

Figure 10:
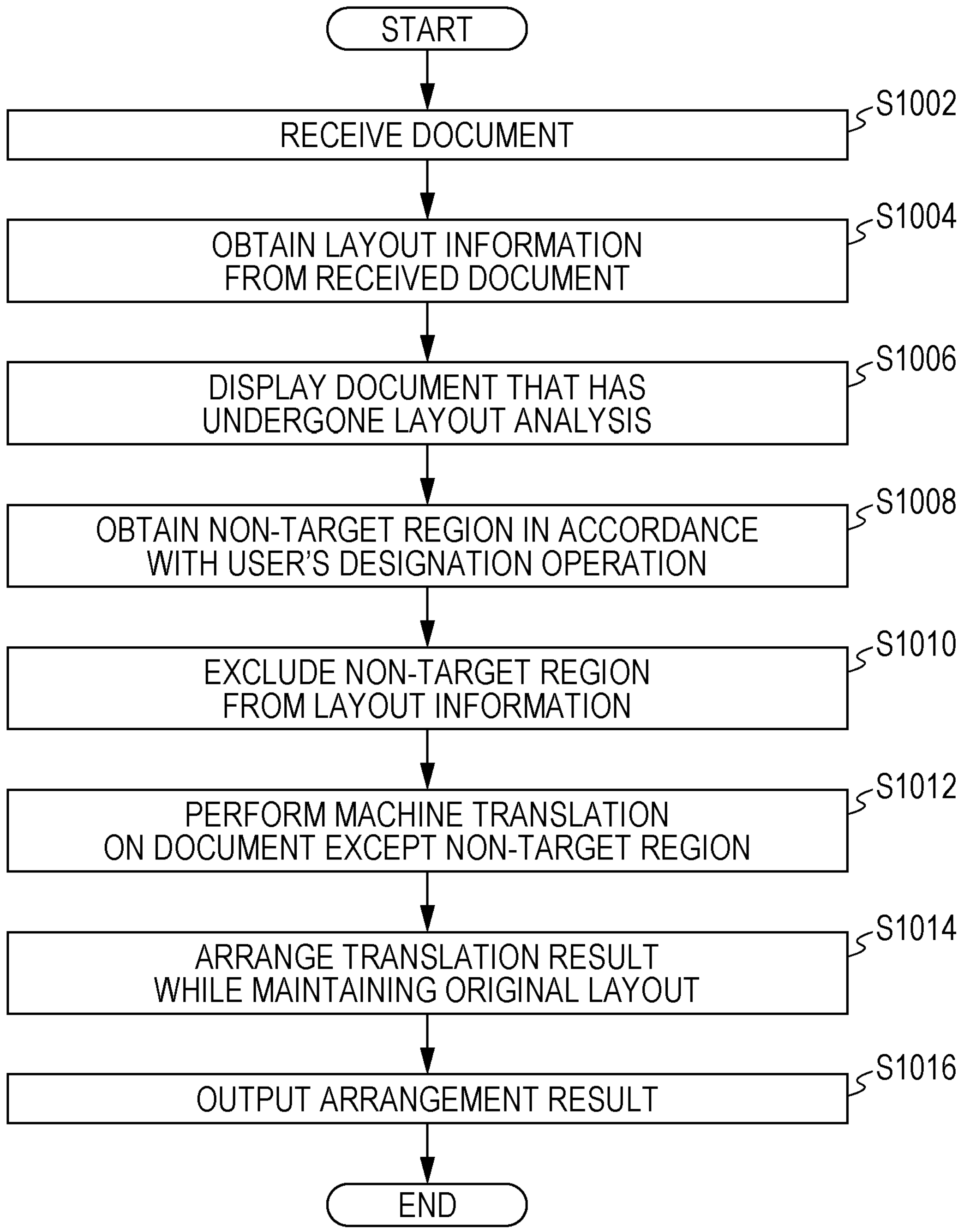
FIG. 10 is a flowchart illustrating an example process according to the exemplary embodiment.

FIG. 10 is a flowchart illustrating an example process according to the exemplary embodiment.

In the flowchart illustrated in FIG. 4, layout analysis is performed after a non-target region is designated through a user operation. However, a non-target region may be designated after layout analysis is performed, as in the flowchart illustrated in FIG. 10. Step S1002 and steps S1010 to S1016 in the flowchart illustrated in FIG. 10 are equivalent to step S402 and steps S410 to S416 in the flowchart illustrated in FIG. 4.

In step S1002, the document receiving module 105 receives a document.

In step S1004, the layout analyzing module 120 obtains layout information from the received document.

In step S1006, the non-target region obtaining module 115 displays a document that has undergone layout analysis.

In step S1008, the non-target region obtaining module 115 obtains a non-target region in accordance with a user's designation operation. The user is capable of designating the non-target region (or selecting a region as a layout analysis result as is) while seeing the layout analysis result.

In step S1010, the non-target region obtaining module 115 excludes the non-target region from the layout information.

In step S1012, the machine translation module 125 performs machine translation on the document except the non-target region.

In step S1014, the output module 130 arranges a translation result while maintaining the layout in the original document.

In step S1016, the output module 130 outputs an arrangement result.

FIGS. 11A to 11D are explanatory diagrams illustrating an example process according to the exemplary embodiment.

Figure 11A:
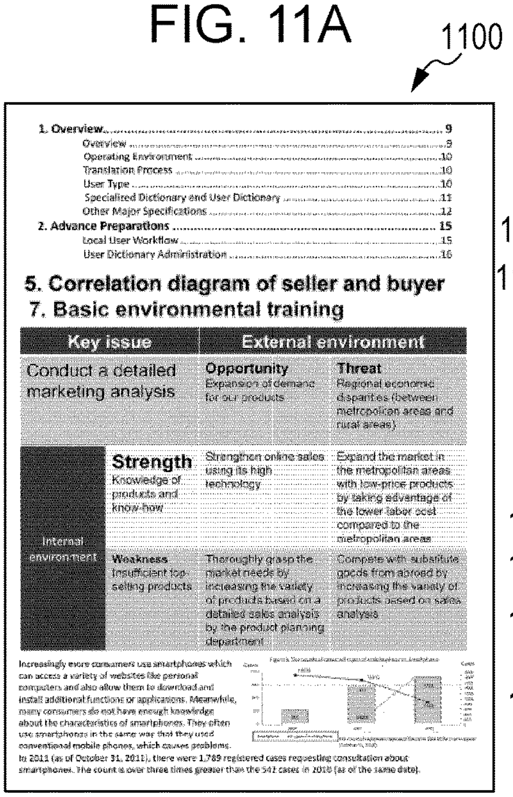
FIGS. 11A to 11D are explanatory diagrams illustrating an example process according to the exemplary embodiment.

FIG. 11A illustrates a document 1100 as a target to be translated, received by the document receiving module 105. The document 1100 includes a graph region adjacent to a text region. This graph region is a non-target region.

Figure 11B:
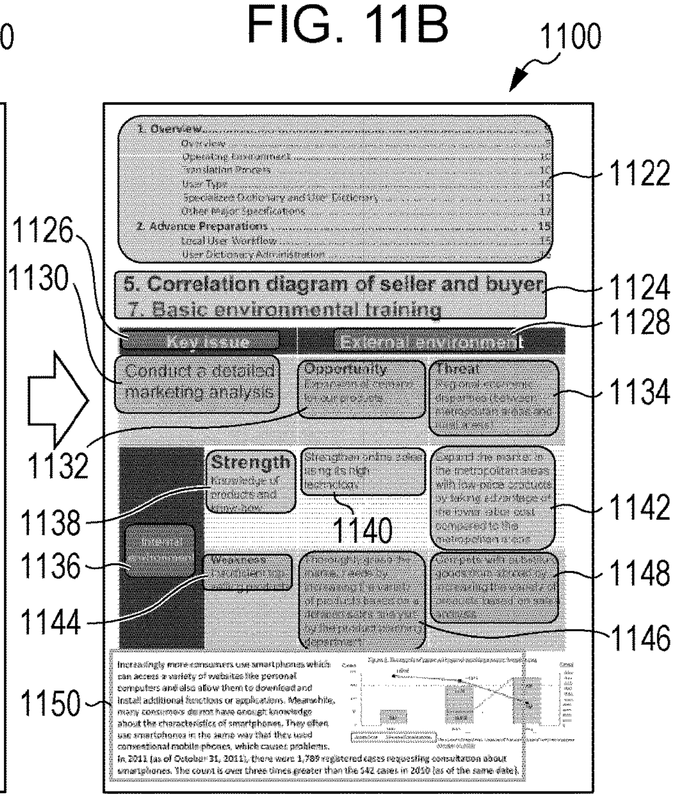

FIG. 11B illustrates an example of a layout analysis result obtained from the layout analyzing module 120. The document 1100 includes a text region 1122, a text region 1124, a text region 1126, a text region 1128, a text region 1130, a text region 1132, a text region 1134, a text region 1136, a text region 1138, a text region 1140, a text region 1142, a text region 1144, a text region 1146, a text region 1148, and a text region 1150. These regions are obtained as a layout analysis result of the document 1100, and are obtained without any user operation.

Figure 11C:
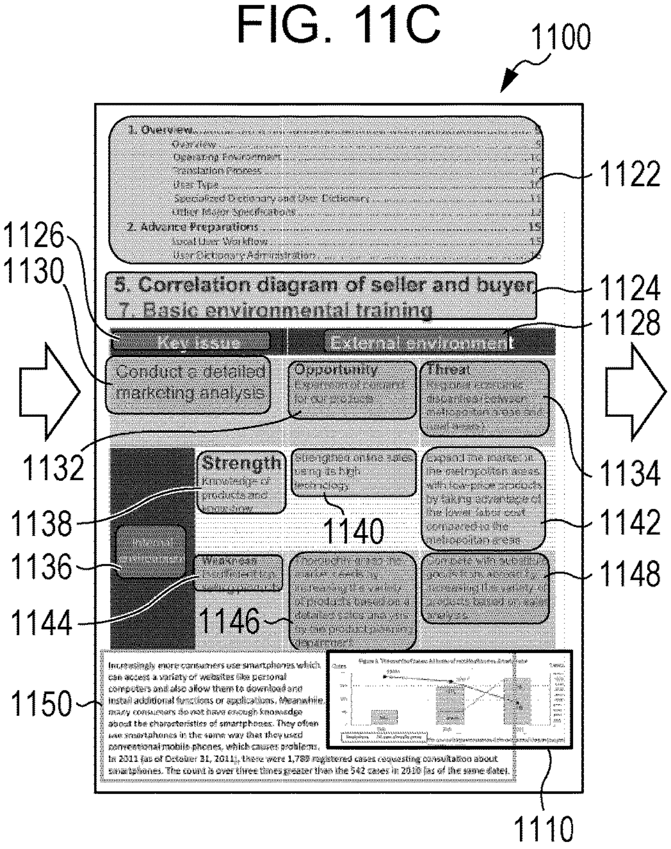

FIG. 11C illustrates an example in which a non-target region 1110 in the document 1100 is designated through a user operation and the non-target region obtaining module 115 obtains the non-target region 1110. That is, a region obtained by excluding the non-target region 1110 from the text region 1150 corresponds to a target to be translated. The other text regions become a target to be translated upon designation of the non-target region being finished.

If the non-target region 1110 is not designated (if the information processing apparatus 100 is not used), a label and a heading on a graph axis are regarded as a part of the text region on the left side of the graph (text region 1150), and an inappropriate translation result may be output. In addition, the translation result of the region on the left side of the graph may be superimposed on the graph.

Depending on a layout analysis algorithm used in the layout analyzing module 120, only a graph region may be extracted. In this case, the graph region may be selected as a non-target region.

Figure 11D:
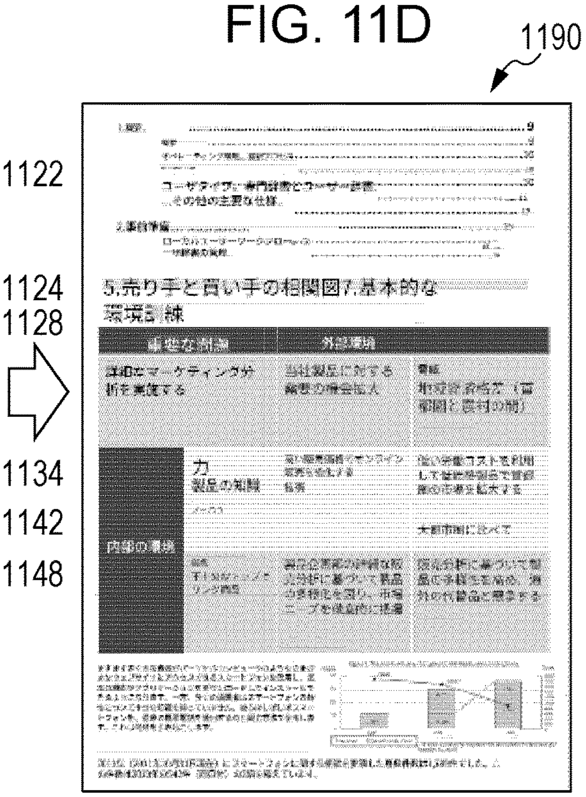

FIG. 11D illustrates an example of an output result of a translation result 1190. The translation is performed while maintaining the layout in the document 1100. The non-target region 1110 is displayed without being translated.

Figure 12:
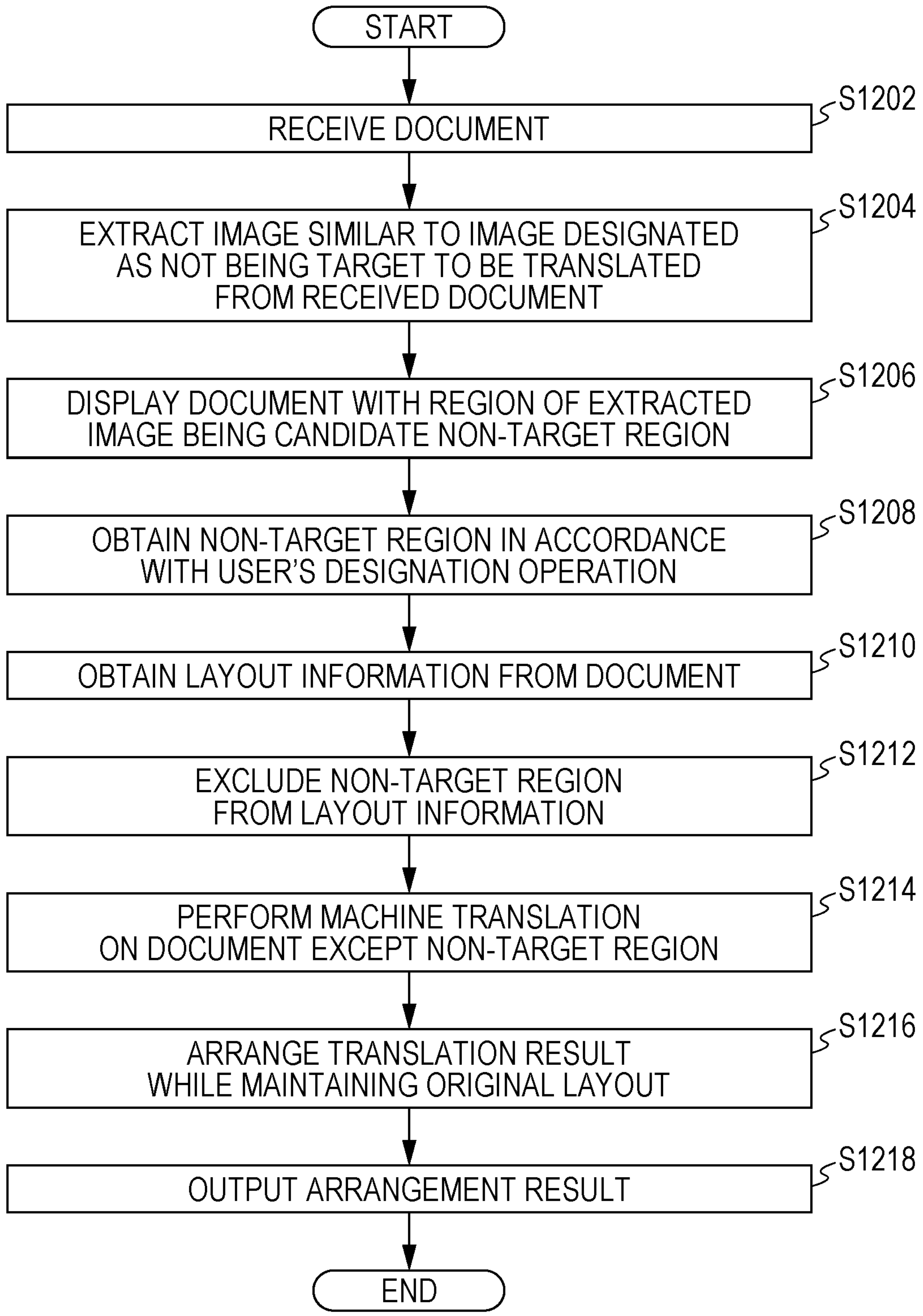
FIG. 12 is a flowchart illustrating an example process according to the exemplary embodiment.

FIG. 12 is a flowchart illustrating an example process according to the exemplary embodiment.

The flowchart illustrated in FIG. 12 is an example process of extracting a region of an image similar to an image that has already been designated as not being a target to be translated and presenting the extracted region as a candidate non-target region.

Step S1202 and steps S1210 to S1218 in the flowchart illustrated in FIG. 12 are equivalent to step S402 and steps S408 to S416 in the flowchart illustrated in FIG. 4.

In step S1202, the document receiving module 105 receives a document.

In step S1204, an image similar to an image that has already been designated as not being a target to be translated is extracted from the received document. Here, "an image that has already been designated as not being a target to be translated" is, for example, a predetermined image or an image in a region that has already been designated as a non-target region through an operator's operation or the like. "A predetermined image" is, for example, an image designated by a manager or the like, and generally may be a logo image, a symbol (for example, a map symbol), a pictogram, or the like. "A region that has already been designated as a non-target region through an operator's operation" corresponds to a region that has previously been designated as a non-target region through processing by the information processing apparatus 100. To extract a similar image, an existing technique may be used. For example, a pattern matching technique may be used. Alternatively, features may be extracted and a degree of match in the feature space may be used.

In step S1206, the document is displayed with the region of the extracted image being a candidate non-target region. For example, the candidate non-target region may be highlighted by, for example, displaying it with a red frame or blinking it.

In step S1208, the non-target region obtaining module 115 obtains a non-target region in accordance with a user's designation operation. Here, the user is capable of designating a non-target region only by selecting a candidate non-target region.

In step S1210, the layout analyzing module 120 obtains layout information from the document.

In step S1212, the non-target region obtaining module 115 excludes the non-target region from the layout information.

In step S1214, the machine translation module 125 performs machine translation on the document except the non-target region.

In step S1216, the output module 130 arranges a translation result while maintaining the layout in the original document.

In step S1218, the output module 130 outputs an arrangement result.

If the processing result in step S1206 is correct, the user finishes step S1210 without designating a non-target region.

If the processing result in step S1206 has an error, an operation of changing a candidate non-target region to a target region or an operation of changing a target region to a non-target region is performed.

Figure 13:
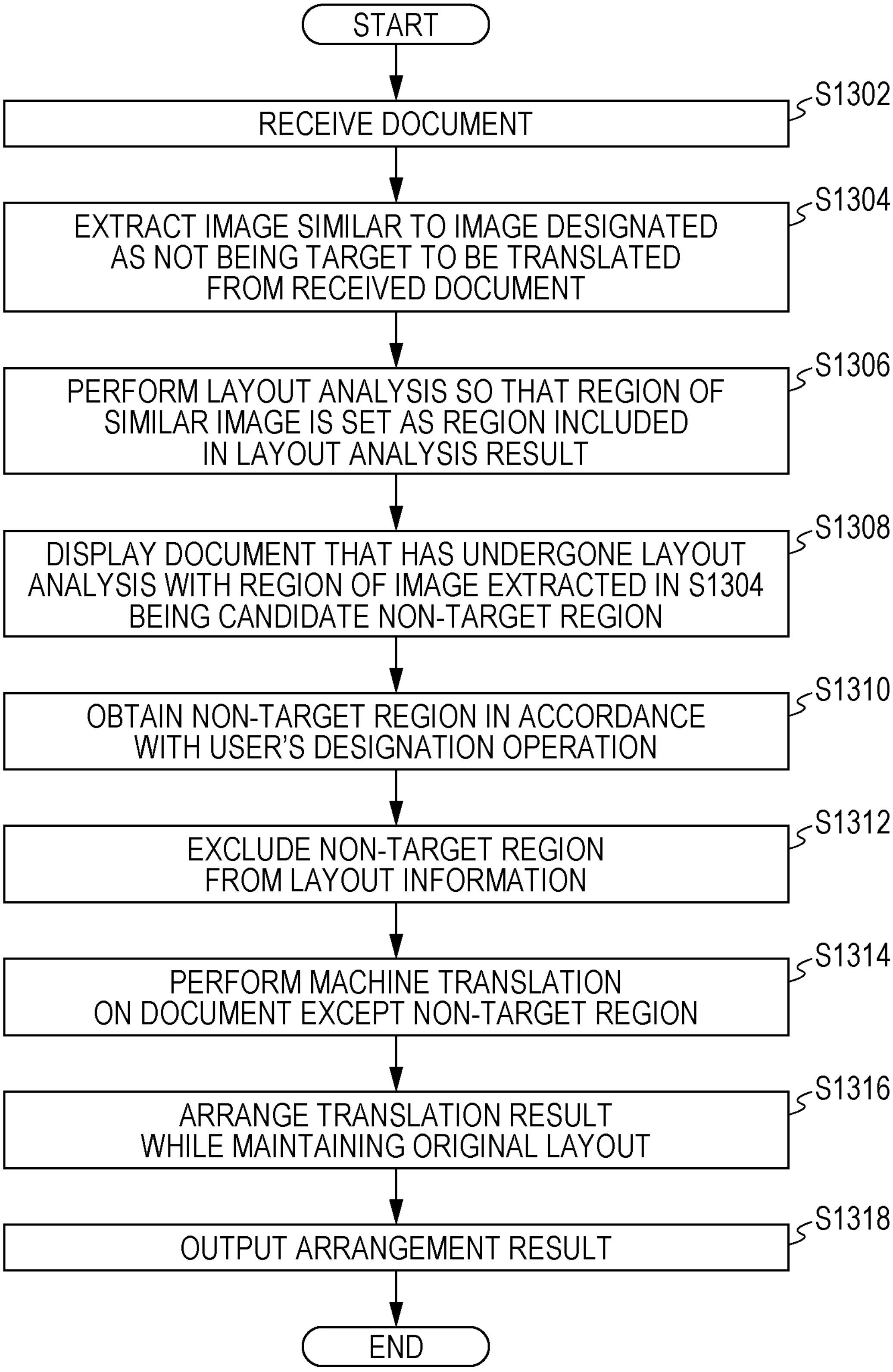
FIG. 13 is a flowchart illustrating an example process according to the exemplary embodiment.

FIG. 13 is a flowchart illustrating an example process according to the exemplary embodiment.

In the flowchart illustrated in FIG. 12, layout analysis is performed after a non-target region is designated through a user operation. However, as in the flowchart illustrated in FIG. 13, a non-target region may be designated after layout analysis is performed. Step S1302, step S1304, and steps S1312 to S1318 in the flowchart illustrated in FIG. 13 are equivalent to step S1202, step S1204, and steps S1212 to S1218 in the flowchart illustrated in FIG. 12.

In step S1302, the document receiving module 105 receives a document.

In step S1304, an image similar to an image that has already been designated as not being a target to be translated is extracted from the received document.

In step S1306, layout analysis is performed so that the region of the similar image is set as a region in a layout analysis result. Specifically, the region of the similar image is handled as a region that has undergone layout analysis, thereby being set as a region in a layout analysis result.

In step S1308, the document that has undergone layout analysis is displayed with the region of the image extracted in step S1304 being a candidate non-target region.

In step S1310, the non-target region obtaining module 115 obtains a non-target region in accordance with a user's designation operation.

In step S1312, the non-target region obtaining module 115 excludes the non-target region from the layout information.

In step S1314, the machine translation module 125 performs machine translation on the document except the non-target region.

In step S1316, the output module 130 arranges a translation result while maintaining the layout in the original document.

In step S1318, the output module 130 outputs an arrangement result.

FIGS. 14A and 14B are explanatory diagrams illustrating an example process according to the exemplary embodiment.

FIG. 14A illustrates an image 1400 as a target to be translated, received by the document receiving module 105. The image 1400 includes regions of map symbols adjacent to text regions. These map symbol regions are non-target regions.

Here, an image similar to an image that has already been designated as not being a target to be translated is extracted by using a non-target image table 1500. FIG. 15 is an explanatory diagram illustrating an example data structure of the non-target image table 1500. The non-target image table 1500 includes an ID column 1510 and a non-target image column 1520. The ID column 1510 stores information (ID) for uniquely identifying an image that is not a target to be translated in the exemplary embodiment. The non-target image column 1520 stores an image that is not a target to be translated. Here, an image itself may be stored, the name of a file storing the image (storage position such as a URL) may be stored, or a feature extraction result may be stored. An image similar to an image included in the non-target image column 1520 is extracted from the image 1400. That is, the region of the similar image is regarded as a candidate non-target region.

The example illustrated in FIG. 14B corresponds to step S1308. A candidate non-target region 1410, a candidate non-target region 1420, and a candidate non-target region 1430 are displayed as regions of images similar to the image included in the non-target image column 1520, and a text region 1412, a text region 1422, and a text region 1432 as a target to be translated are displayed as a result of layout analysis. If the user determines that the candidate non-target regions 1410, 1420, and 1430 are non-target regions, the user may end the process without performing any operation. If there is an error, the user may designate a non-target region or may cancel the designation of a candidate non-target region.

Figure 16:
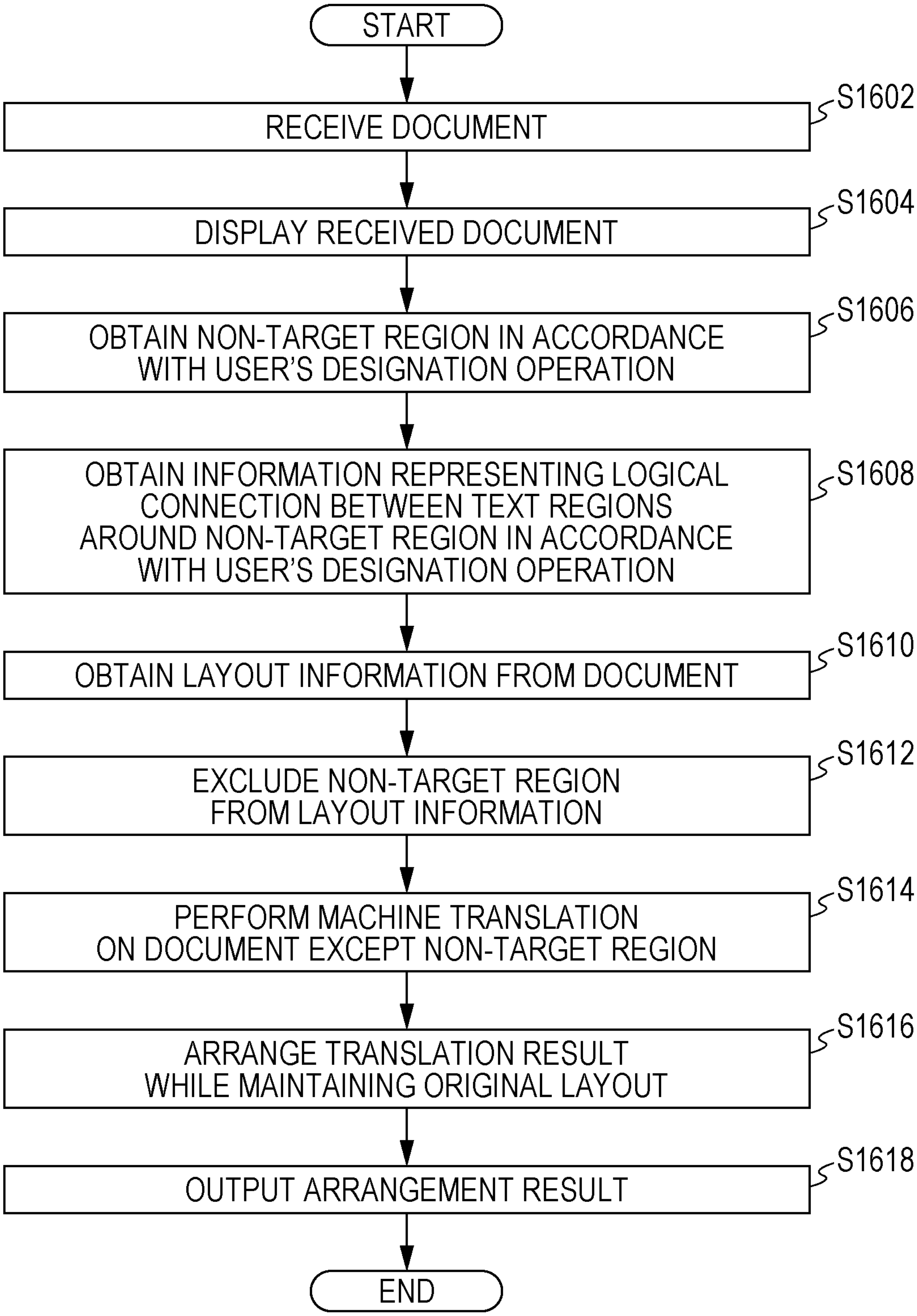
FIG. 16 is a flowchart illustrating an example process according to the exemplary embodiment.

FIG. 16 is a flowchart illustrating an example process according to the exemplary embodiment.

The flowchart illustrated in FIG. 16 is the flowchart illustrated in FIG. 4 added with a process of designating a connection between text regions around a non-target region. Steps S1602 to S1606 and steps S1610 to S1618 in the flowchart illustrated in FIG. 16 are equivalent to steps S402 to S406 and steps S408 to S416 in the flowchart illustrated in FIG. 4.

In step S1602, the document receiving module 105 receives a document.

In step S1604, the non-target region obtaining module 115 displays the receive document.

In step S1606, the non-target region obtaining module 115 obtains a non-target region in accordance with a user's designation operation.

In step S1608, the non-target region obtaining module 115 obtains information representing a logical connection between text regions around the non-target region in accordance with a user operation of designating a connection. If there are plural text regions around the non-target region, the text regions may or may not have a connection with each other in accordance with the non-target region. If the text regions have a connection with each other, there may be plural types of connections. If the text regions are connected wrongly, a correct translation result is not obtained. For this reason, the user determines a connection through a designation operation.

In step S1610, the layout analyzing module 120 obtains layout information from the document.

In step S1612, the non-target region obtaining module 115 excludes the non-target region from the layout information.

In step S1614, the machine translation module 125 performs machine translation on the document except the non-target region.

In step S1616, the output module 130 arranges a translation result while maintaining the layout in the original document.

In step S1618, the output module 130 outputs an arrangement result.

In the flowchart illustrated in FIG. 16, layout analysis is performed after obtaining a non-target region and obtaining information representing a logical connection between text regions. Alternatively, as in the above-described examples illustrated in FIGS. 10 and 13, a non-target region and information representing a logical connection may be obtained after performing layout analysis.

Figures 17A, 17B:
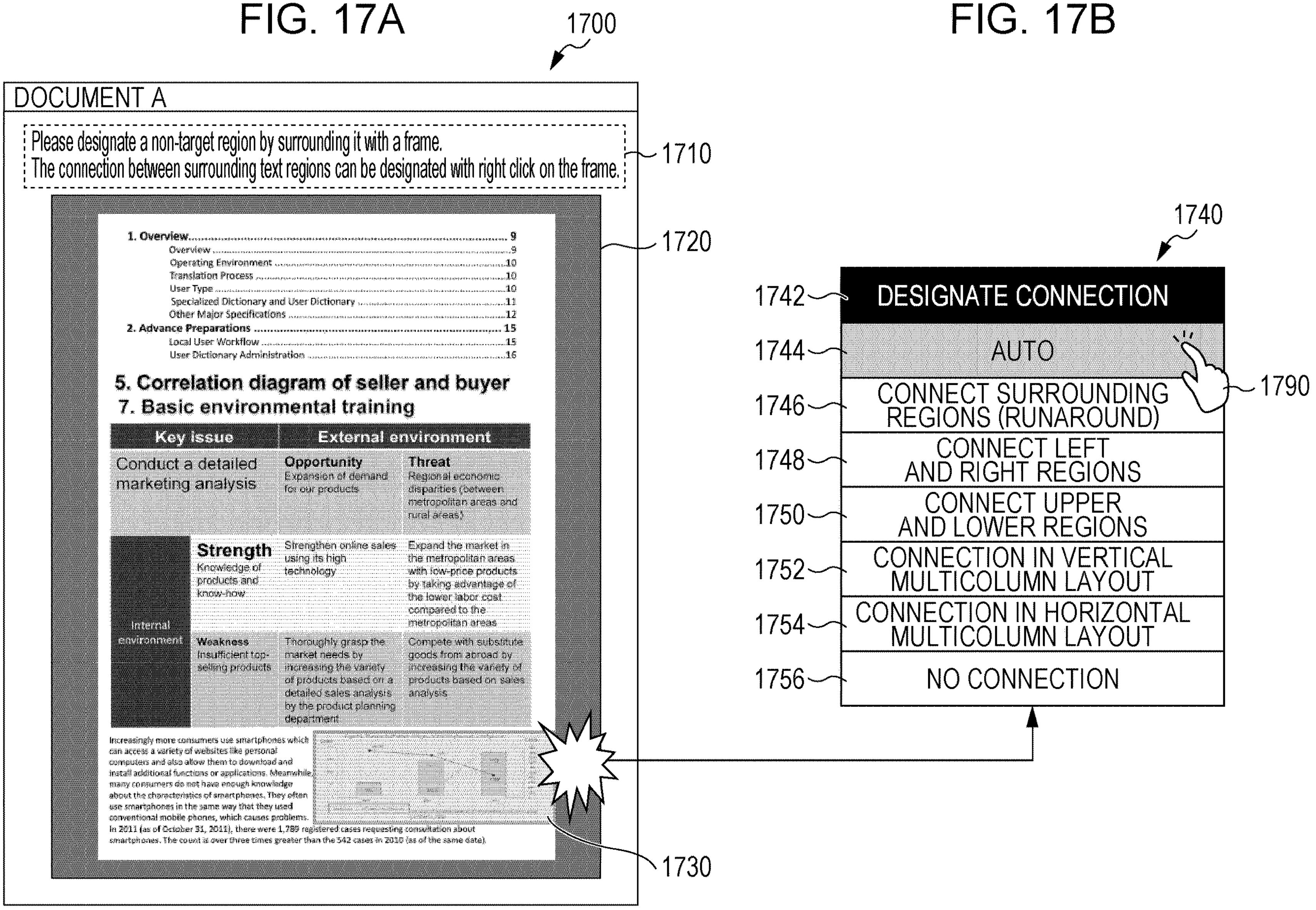
FIGS. 17A and 17B are explanatory diagrams illustrating an example process according to the exemplary embodiment.

FIGS. 17A and 17B are explanatory diagrams illustrating an example process according to the exemplary embodiment.

As illustrated in FIG. 17A, the non-target region obtaining module 115 displays a document in a document display region 1720 of a screen 1700. Also, the non-target region obtaining module 115 displays a message region 1710 in the document display region 1720, and displays, for example, a message "Please designate a non-target region by surrounding it with a frame. The connection between surrounding text regions can be designated with right click on the frame." in the message region 1710.

Here, it is assumed that a non-target region 1730 is designated through a user operation.

Subsequently, if a right click is performed on the non-target region 1730, a connection menu 1740 illustrated in FIG. 17B is displayed. The connection menu 1740 is a menu from which a type of connection is selected and includes a title field 1742, an auto field 1744, a "connect surrounding regions (runaround)" field 1746, a "connect left and right regions" field 1748, a "connect upper and lower regions" field 1750, a "connection in vertical multicolumn layout" field 1752, a "connection in horizontal multicolumn layout" field 1754, and a "no connection" field 1756. Any one of these fields is designated by using a pointer 1790.

FIGS. 18A to 18D are explanatory diagrams illustrating an example process according to the exemplary embodiment.

As illustrated in FIG. 18A, a document 1800 includes a logo region 1830 designated as a non-target region and a sentence region 1810, a sentence region 1820, a sentence region 1840, and a sentence region 1850 obtained as a layout analysis result.

As illustrated in FIG. 18B1, if a right click is performed on the non-target region 1830, the connection menu 1740 illustrated in FIG. 18B2 is displayed. Here, it is assumed that the "connect surrounding regions (runaround)" field 1746 is selected by using the pointer 1790.

When the "connect surrounding regions (runaround)" field 1746 is selected, the logo region 1830 as a non-target region is excluded and the character strings in the sentence regions 1810, 1820, 1840, and 1850 are connected to each other. Specifically, as illustrated in FIG. 18C, a connection mark 1812, a connection mark 1814, a connection mark 1822, and a connection mark 1844 are displayed, so that the character strings in the sentence region 1810 are followed by the character string in the first line of the sentence region 1820, the character string in the first line of the sentence region 1840, the character string in the second line of the sentence region 1820, the character string in the second line of the sentence region 1840, the character string in the third line of the sentence region 1820, the character string in the third line of the sentence region 1840, and the character strings in the sentence region 1850 in this order. That is, as illustrated in FIG. 3, the following sentences are regarded as a target to be translated. "Since its founding in 1962, Fuji Xerox has contributed to the "democratization of information" through the transmission of documents by means of copying machines. Since then, in the 1990s, not only did the information volume dramatically increase due to the IT revolution, its distribution route and form also diversified and became complicated. Furthermore, with the evolution of information and communication technology (ICT) in recent years, power to select and utilize valuable knowledge and information has become more demanded. Under such a large paradigm shift, it is becoming difficult for us as well as our customers to continue business growth in the former way. The real value as a company is questioned in determining how to face the complex and advanced information-oriented society and how to continue business growth."

If the "connect left and right regions" field 1748 is selected, the character strings in the sentence region 1820 are connected to the character strings in the sentence region 1840. If the "connect upper and lower regions" field 1750 is selected, the character strings in the sentence region 1810 are connected to the character strings in the sentence region 1850. If the "connection in vertical multicolumn layout" field 1752 is selected, character strings are connected in a vertical multicolumn layout. If the "connection in horizontal multicolumn layout" field 1754 is selected, character strings are connected in a horizontal multicolumn layout. If the "no connection" field 1756 is selected, a process of connecting character strings is not performed, and the character strings in each text region are regarded as a target to be translated. These types of connection are merely examples, and another type of connection may be included.

FIG. 18D illustrates an example of a translation result. A translation result 1890 is a result of translating the foregoing document, in which the non-target region 1830 is displayed without being translated.

FIGS. 19A to 19C are explanatory diagrams illustrating an example process according to the exemplary embodiment.

As illustrated in FIG. 19A, a document 1900 is divided into a text region 1910, a text region 1920, a text region 1930, and a text region 1940, which are targets to be translated, as a result of layout analysis.

As illustrated in FIG. 19B1, it is assumed that a non-target region 1912 in the text region 1910 is designated through a user operation. Also, it is assumed that a right click is performed on the non-target region 1912 through a user operation and that the "no connection" field 1756 is selected from the connection menu 1740 by using the pointer 1790, as illustrated in FIG. 19B2.

Accordingly, as illustrated in FIG. 19C, the text region 1910 is divided into a text region 1914 and a text region 1916, and the sentence in the text region 1914 and the sentences in the text region 1916 are set as targets to be translated independent of each other.

The image in the non-target region 1912 is stored as an image that has already been designated as not being a target to be translated. Also, the connection in this case ("no connection" in the example in FIG. 19B2) is stored in association with the image. That is, if an image similar to this image is extracted thereafter, the connection set for this image is also applied to the connection with a text region around the similar image.

Figure 20A:
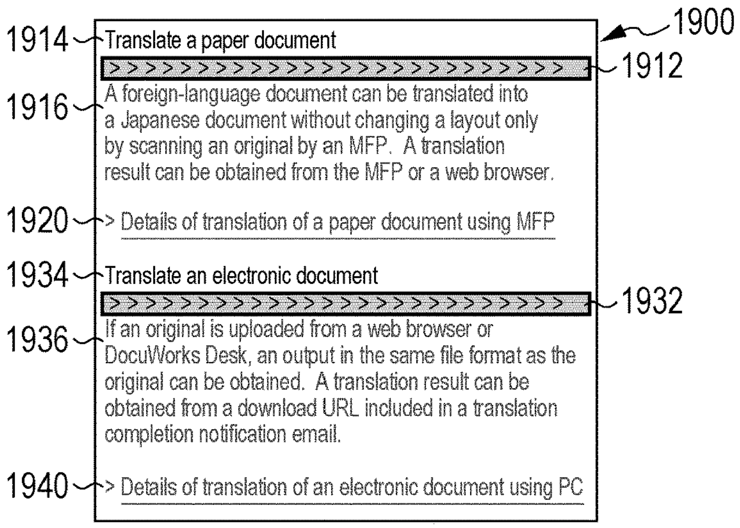
FIGS. 20A to 20C are explanatory diagrams illustrating an example process according to the exemplary embodiment.
Figure 20B:
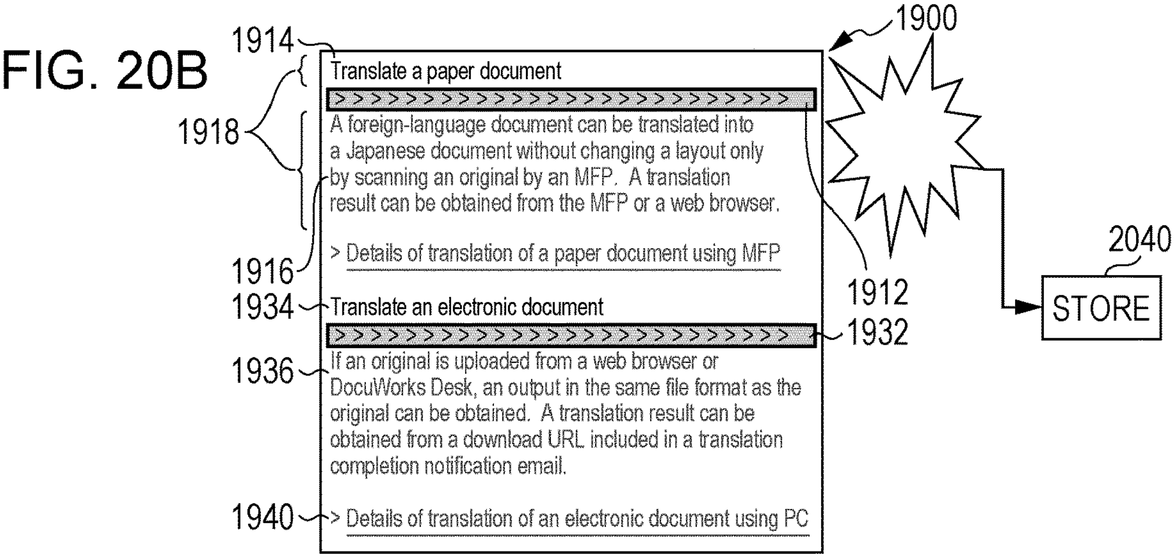
Figure 20C:
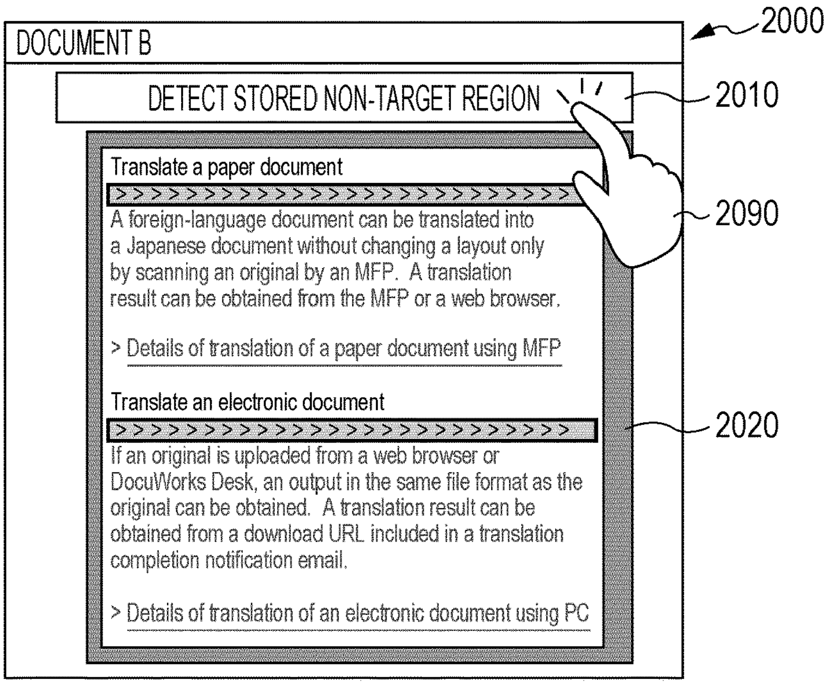

FIGS. 20A to 20C are explanatory diagrams illustrating an example process according to the exemplary embodiment.

As illustrated in FIG. 20A, a non-target region 1932 similar to the non-target region 1912 is extracted. Accordingly, the text region 1930 is divided into a text region 1934 and a text region 1936 by the non-target region 1932.

As illustrated in FIG. 20B, a connection 1918 between the character string in the text region 1914 and the character strings in the text region 1916 is stored (denoted by 2040) in association with the image in the non-target region 1912, and thus the connection 1918 is applied as a connection (here, "no connection") between the character string in the text region 1934 and the character strings in the text region 1936.

As illustrated in FIG. 20C, a detection button 2010 for a stored non-target region and a document display region 2020 are displayed on a screen 2000 as a user interface.

For example, if the detection button 2010 for a stored non-target region is selected by using a pointer 2090, a region of an image similar to the non-target region 1912 is extracted from the document in the document display region 2020, and the connection corresponding to the text region 1914 is applied to the text regions above and below the extracted region.

Figure 21:
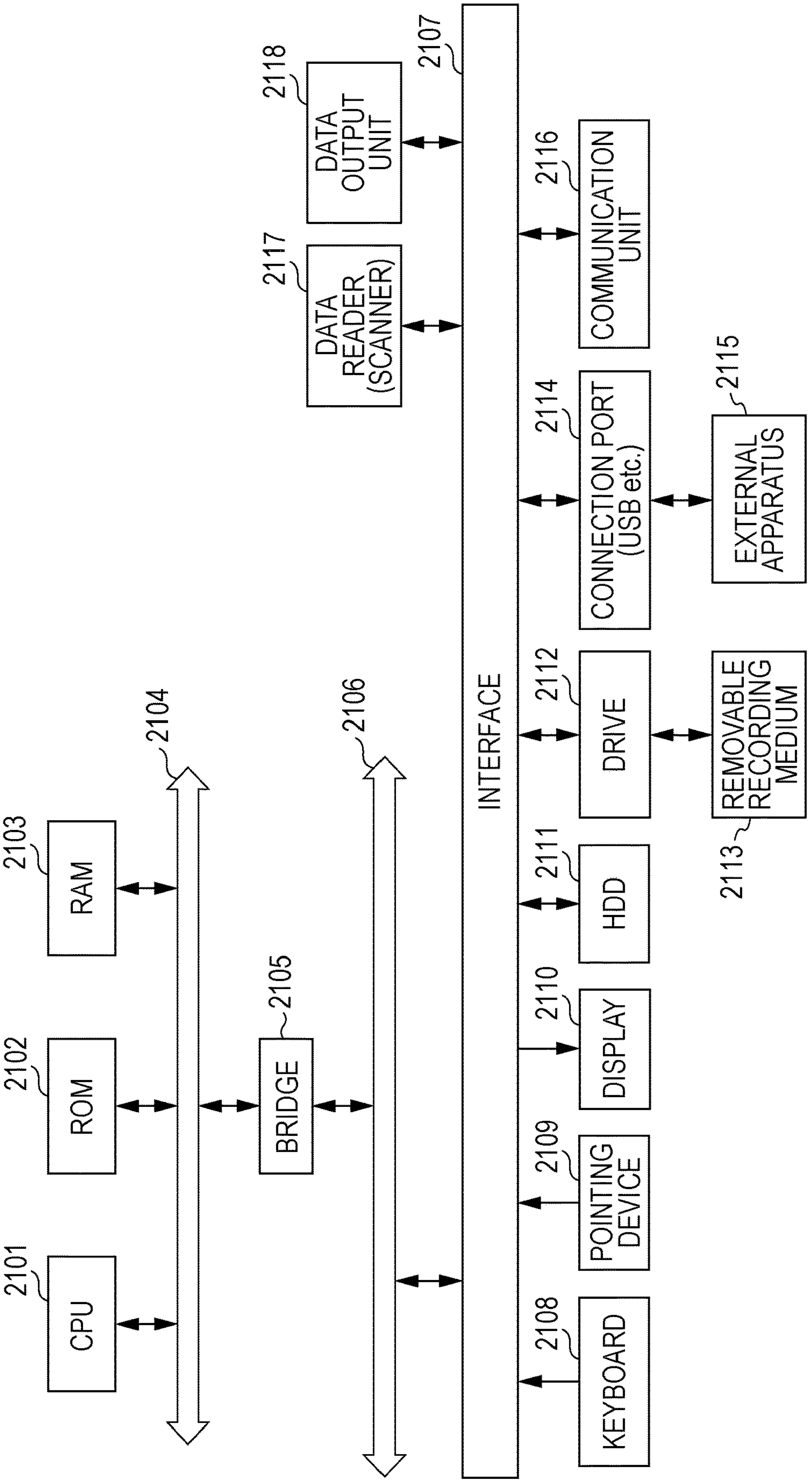
FIG. 21 is a block diagram illustrating an example hardware configuration of a computer that implements the exemplary embodiment.

An example hardware configuration of the information processing apparatus according to the exemplary embodiment will be described with reference to FIG. 21. The configuration illustrated in FIG. 21 is the configuration of a personal computer (PC), for example. This example hardware configuration includes a data reader 2117 such as a scanner and a data output unit 2118 such as a printer.

A central processing unit (CPU) 2101 is a controller that executes processing in accordance with a computer program describing the execution sequence of individual modules described in the exemplary embodiment, that is, the document receiving module 105, the translation processing module 110, the non-target region obtaining module 115, the layout analyzing module 120, the machine translation module 125, and the output module 130.

A read only memory (ROM) 2102 stores programs, arithmetic parameters, and so forth used by the CPU 2101. A random access memory (RAM) 2103 stores programs used in execution by the CPU 2101, parameters that change in the execution, and so forth. These devices are connected to each other through a host bus 2104 formed of a CPU bus or the like.

The host bus 2104 is connected to an external bus 2106 such as a peripheral component interconnect/interface (PCI) bus through a bridge 2105.

A keyboard 2108 and a pointing device 2109 such as a mouse are devices operated by an operator. A display 2110 is a liquid crystal display (LCD) device, a cathode ray tube (CRT), or the like, and displays various pieces of information as text or image information. Alternatively, a touch screen or the like having the functions of both the pointing device 2109 and the display 2110 may be used. In this case, a software keyboard (also referred to as a screen keyboard) may be displayed on a screen (touch screen) instead of physically connecting the keyboard 2108, thereby implementing the function of a keyboard.

A hard disk drive (HDD) 2111 includes a hard disk (or may be a flash memory or the like) therein, drives the hard disk, and records or reproduces a program executed by the CPU 2101 or information. The hard disk stores the non-target region table 600, the layout information table 700, the layout information table (after process) 800, the non-target image table 1500, a document as a target to be translated, a translation result, a document in which a translation result is reflected, and so forth. In addition, other various pieces of data and various computer programs are stored.

A drive 2112 reads data or a program recorded on a removable recording medium 2113 loaded therein, such as a magnetic disk, an optical disc, a magneto-optical disc, or a semiconductor memory, and supplies the data or program to the RAM 2103 connected through an interface 2107, the external bus 2106, the bridge 2105, and the host bus 2104. The removable recording medium 2113 is also usable as a data recording region.

A connection port 2114 is a port for connecting an external apparatus 2115, and includes a connection unit for USB, IEEE 1394, or the like. The connection port 2114 is connected to the CPU 2101 and so forth through the interface 2107, the external bus 2106, the bridge 2105, and the host bus 2104. A communication unit 2116 is connected to a communication line and performs a data communication process of communicating with an external apparatus. The data reader 2117 is a scanner, for example, and performs a process of reading a document. The data output unit 2118 is a printer, for example, and performs a process of outputting document data.

The hardware configuration of the information processing apparatus illustrated in FIG. 21 is merely one example configuration. The exemplary embodiment is not limited to the configuration illustrated in FIG. 21, and the information processing apparatus may have any configuration as long as the apparatus is capable of executing the modules described in the exemplary embodiment. For example, one or some of the modules may be configured by using dedicated hardware (for example, an application specific integrated circuit (ASIC) or the like). One or some of the modules may be included in an external system and connected through a communication line. Furthermore, plural systems, each being the system illustrated in FIG. 21, may be connected to each other through a communication line and may operate in cooperation with each other. Alternatively, the system illustrated in FIG. 21 may be incorporated in a mobile information communication apparatus (for example, a mobile phone, a smartphone, a mobile apparatus, a wearable computer, or the like), an information home appliance, a robot, a copier, a facsimile, a scanner, a printer, a multifunction peripheral, or the like, as well as a personal computer.

The above-described program may be provided by being stored in a recording medium, or may be provided via a communication medium. In this case, for example, the above-described program may be regarded as a "computer readable recording medium storing the program".

The "computer readable recording medium storing the program" is a computer readable recording medium that stores the program and that is used to install, execute, or circulate the program.

Examples of the recording medium include a digital versatile disc (DVD), for example, the standards defined by the DVD forum: DVD-R, DVD-RW, DVD-RAM, and so forth; and the standards defined by DVD+RW: DVD+R, DVD+RW, and so forth; a compact disc (CD), for example, a read only memory (CD-ROM), a CD recordable (CD-R), a CD rewritable (CD-RW), and so forth; a Blu-ray (registered trademark) Disc; a magneto-optical (MO) disc; a flexible disk (FD); a magnetic tape; a hard disk; a read only memory (ROM); an electrically erasable and programmable ROM (EEPROM, registered trademark); a flash memory; a random access memory (RAM); and a secure digital (SD) memory card.

The whole or part of the above-described program may be stored or circulated by recording it on the recording medium. Alternatively, the whole or part of the program may be transmitted through communication, for example, using a wired network such as a local area network (LAN), a metropolitan area network (MAN), a wide area network (WAN), the Internet, an intranet, or an extranet; a wireless communication network; or a transmission medium that is obtained by combining the wired and wireless networks. Alternatively, the whole or part of the program may be carried using carrier waves.

Furthermore, the above-described program may be part or whole of another program, or may be recorded on a recording medium together with another program. Alternatively, the program may be recorded on plural recording media in a distributed manner. The manner in which the program is recorded is not specified as long as the program is able to be compressed, encrypted, or restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
receive a text as a target to be translated;
receive a portion of the text where a start and an end of the portion within the text are specified by a user;
define the portion of the text as a non-target text, the non-target text being a text that is not a target to be translated; and
perform translation on a portion of the text that is not the non-target text without performing translation on the non-target text.

2. The information processing apparatus according to claim 1, wherein the processor is programmed to:
display a translation result obtained after performing the translation on a screen while maintaining a layout of the non-target text.

3. The information processing apparatus according to claim 2, wherein the processor is programmed to display the translation result on the screen in a region other than the non-target text.

4. The information processing apparatus according to claim 1, wherein the processor is programmed to:
obtain information representing a connection between characters in character regions around the non-target text; and
perform translation in accordance with the connection.

5. The information processing apparatus according to claim 4, wherein the processor is programmed to:
perform layout analysis on a document containing the non-target text;
present a result of the performed layout analysis; and
obtain the information representing the connection between the characters in the character regions in accordance with an operator's instruction to select the connection.

6. A non-transitory computer-readable medium storing a program causing a computer to execute a process for information processing, the process comprising:
receiving a text as a target to be translated;
receiving a portion of the text where a start and an end of the portion within the text are specified by a user;
defining the portion of the text as a non-target text, the non-target text being a text that is not a target to be translated; and
performing translation on a portion of the text that is not the non-target text without performing translation on the non-target text.

* * * * *